Oct. 6, 1936.   A. R. THOMPSON ET AL   2,056,413
PEAR PREPARATION MACHINE
Original Filed April 27, 1931   13 Sheets-Sheet 2

Inventors
Albert R. Thompson
William de Back,
By
Lyon & Lyon
Attorneys

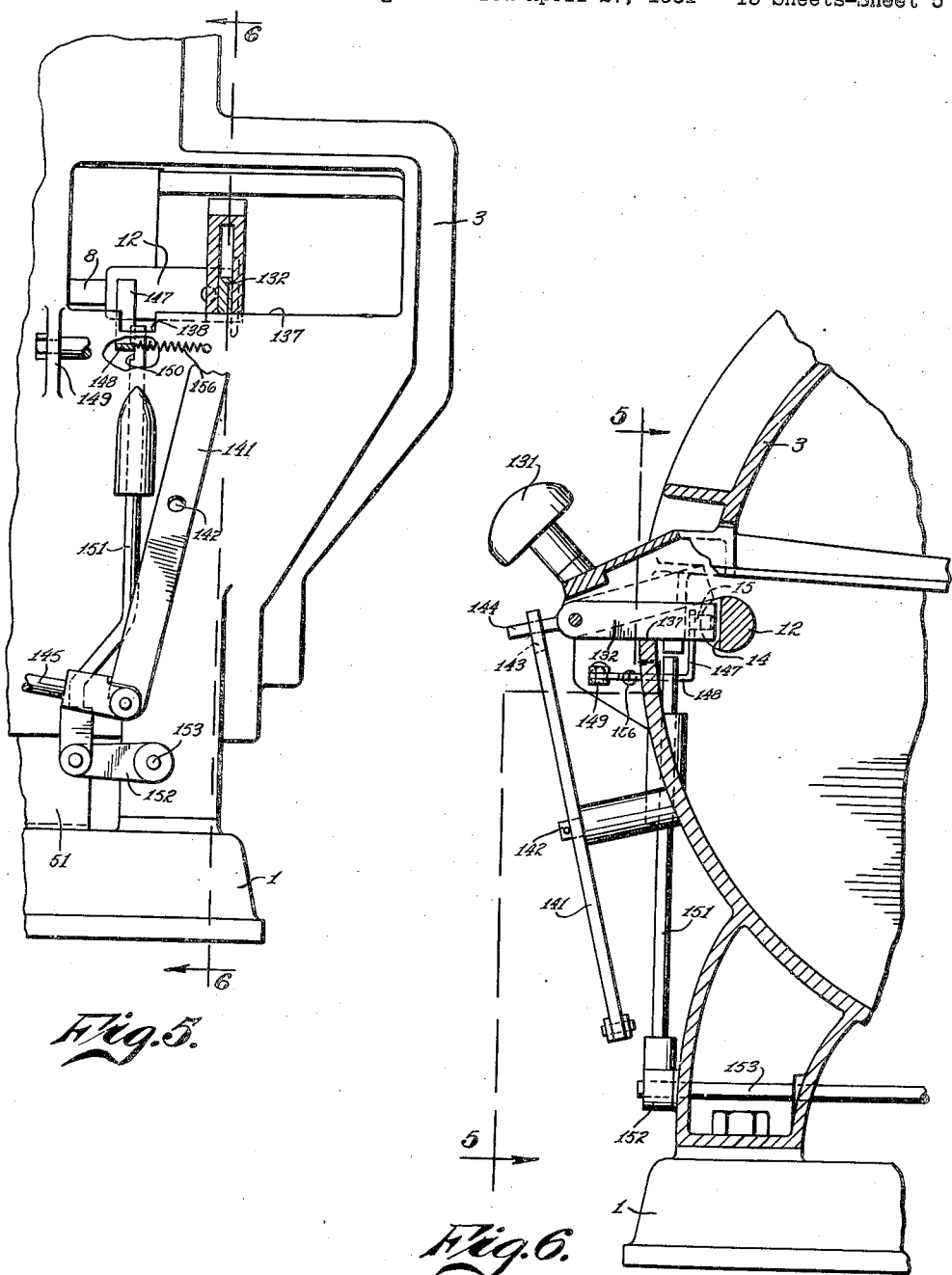

Oct. 6, 1936.  A. R. THOMPSON ET AL  2,056,413
PEAR PREPARATION MACHINE
Original Filed April 27, 1931    13 Sheets-Sheet 9

Inventors
Albert R. Thompson
William de Back.
By Lyon & Lyon
Attorney

Oct. 6, 1936.  A. R. THOMPSON ET AL  2,056,413
PEAR PREPARATION MACHINE
Original Filed April 27, 1931    13 Sheets-Sheet 10

Inventors
Albert R. Thompson
William de Back,
By Lyon & Lyon
Attorneys

Oct. 6, 1936.   A. R. THOMPSON ET AL   2,056,413
PEAR PREPARATION MACHINE
Original Filed April 27, 1931   13 Sheets-Sheet 11

Inventors
Albert R. Thompson
William de Back;
By
Lyon & Lyon
Attorneys

Oct. 6, 1936.   A. R. THOMPSON ET AL   2,056,413
PEAR PREPARATION MACHINE
Original Filed April 27, 1931   13 Sheets-Sheet 13

Inventors.
Albert R. Thompson,
William de Back.
By Lyon & Lyon
Attorneys

Patented Oct. 6, 1936

2,056,413

UNITED STATES PATENT OFFICE 2,056,413

PEAR PREPARATION MACHINE

Albert R. Thompson and William de Back, San Jose, Calif., assignors to Food Machinery Corporation, San Jose, Calif., a corporation of Delaware Application April 27, 1931, Serial No. 533,048
Renewed July 18, 1934

61 Claims. (Cl. 146—33)

This invention relates to a machine for preparing fruit particularly pears, for drying or canning, and has for one of its principal objects the complete preparation of fruit such as pears for canning by removing the stem, peeling, coring and trimming, and then splitting the fruit in halves or quarters.

It is a further object of this invention to provide a pear preparation machine which will stem, peel, core, trim and split the fruit into halves irrespective of shape or size of the fruit and which will render careful grading and selecting of the fruit unnecessary.

It is a further object of this invention to provide a machine which will substantially eliminate all hand work in the preparation of pears for canning or for drying.

It is a further object of this invention to provide a machine which will uniformly shape the pears with the minimum of waste.

It is a further object of this invention to provide a machine which will stem, peel, core, trim and split the fruit without in any manner bruising the fruit and so that the finished product has a very smooth and attractive appearance.

It is a further object of this invention to provide peeling knives which will follow the contour of the pear and remove from the pear a clean cut of uniform thickness.

It is a further object of this invention to provide peeling knives so mounted that a resilient castor action will be obtained to cause the knives to follow the contour of the pear and remove therefrom a peeling of substantially uniform thickness.

It is a further object of this invention to provide a coring clamp means which will automatically clamp the pear to be cored and trimmed firmly, yet without a yielding pressure such as spring clamps would give.

It is a further object of this invention to provide a slitting means for halving or quartering the peeled pears and also the seed pod.

It is a further object of this invention to provide a slitting means for slitting the peeled pears and only partially slitting the cored seed pod whereby the meat of the pear is readily separated from said cored seed pods.

It is a further object of this invention to provide a machine which when set in operation will automatically stop after completing one operating cycle.

It is a further object of this invention to provide a control means which may be actuated to impale the fruit and operable thereafter to start the machine into operation.

It is a further object of this invention to provide a locking means for the clutch actuating mechanism which is releasable by means carried by the fruit impaling spindle when actuated to impale the fruit thereon.

It is a further object of this invention to provide a pear preparation machine which may be operated with or without or partially with and partially without fruit to be pared in the machine without injury to the machine.

It is a further object of this invention to provide means for readily adjusting the amount of trim to be given to the bud end of the pear.

It is a further object of this invention to provide means operable to force the blossom end of the pear a predetermined distance into the trimming knife and trip means operated by the pear to stop further movement of the operable means when the pear has reached said predetermined position.

Other objects and advantages will be apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit and scope of the invention as the same is set forth in the appended claims.

In the drawings—

Figure 5 is a fragmental view of the forward end of the machine taken substantially along the line 5—5 of Figure 6.

Figure 6 is a fragmental sectional view taken substantially along line 6—6 of Figure 5 and illustrates the control handle and the apparatus actuated thereby.

Figure 11:
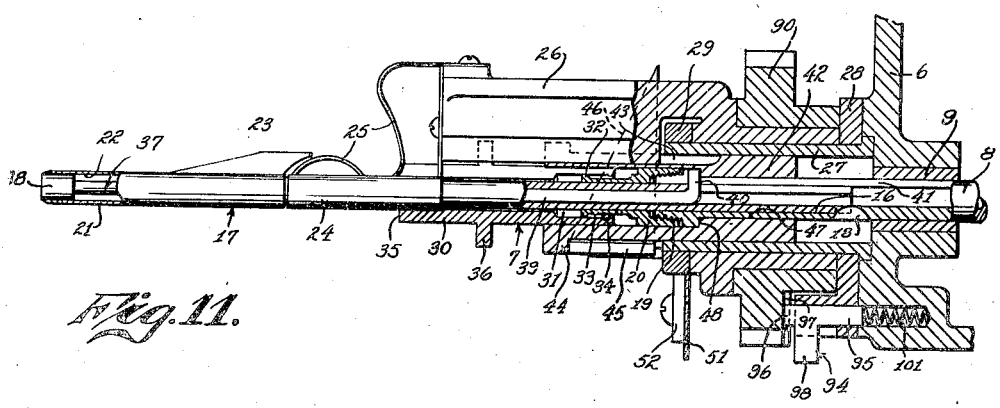

Figure 11 is an enlarged partially sectional view of a portion of the spindle, illustrating the mounting of the stemming tube upon the spindle and also the stem ejector mechanism and cam which has been engaged to actuate the stem ejector into the position to eject the stem of the pear from the stemming tube and also illustrates the mounting of the coring and trimming knives thereon and the actuating and locking means therefor.

Figure 12:
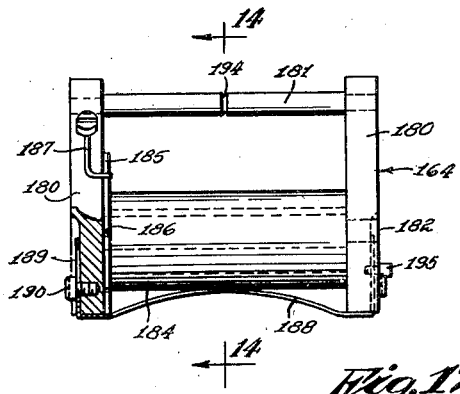

Figure 12 is an enlarged front view of the peeling knife assembly.

Figure 13:
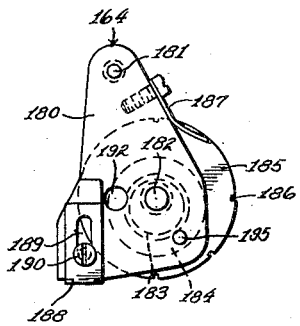

Figure 13 is an end view of Figure 12.

Figure 14:
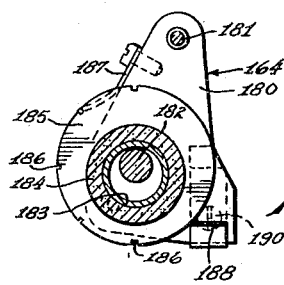

Figure 14 is a cross sectional view taken substantially along line 14—14 of Figure 12.

Figure 2:
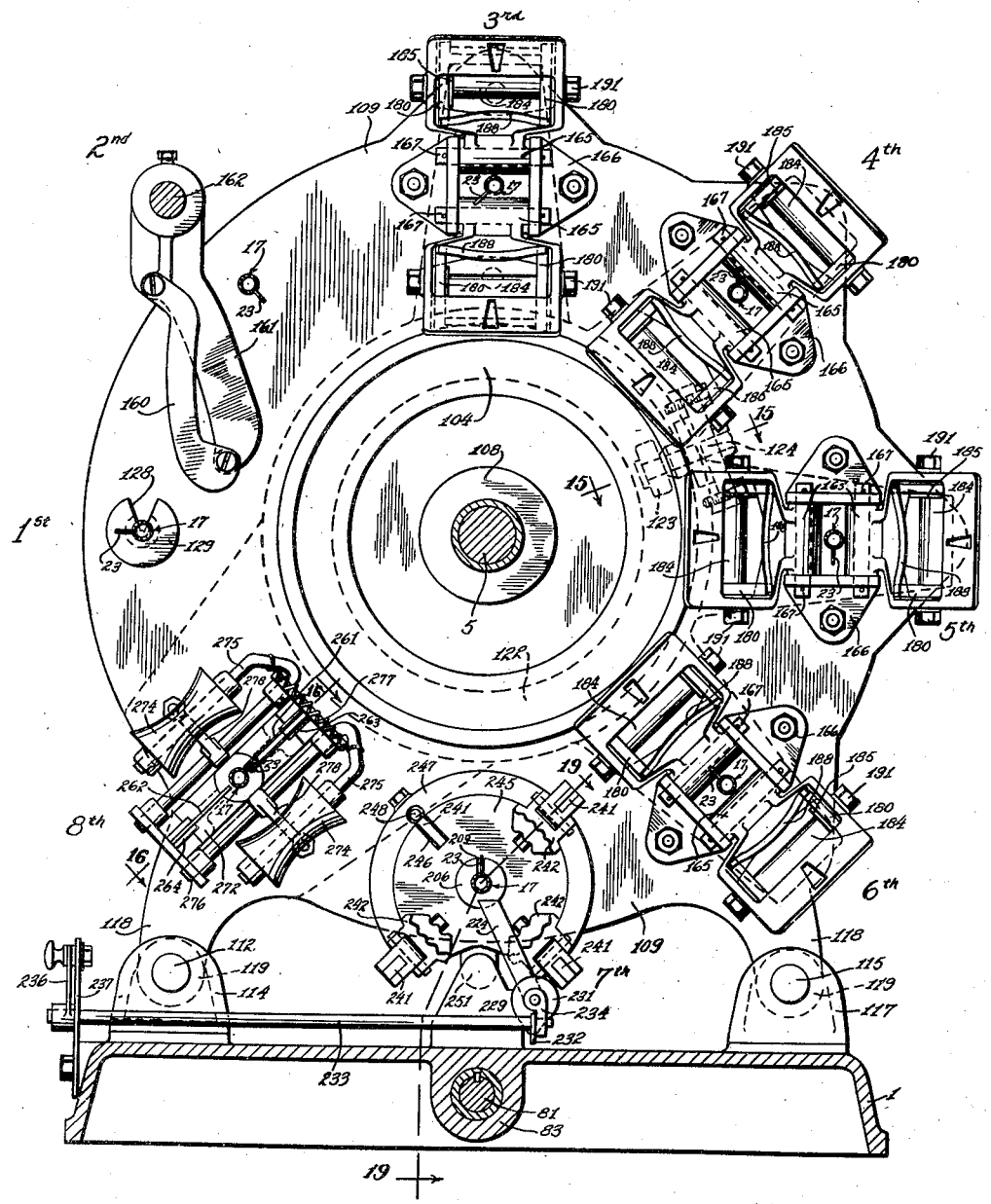
Figure 2 is a sectional view taken substantially along the broken irregular lines 2—2 of Figure 1 and looking in the direction of the arrows and illustrates the forward face of one of the reciprocating heads with the paring means mounted thereon.
Figure 15:
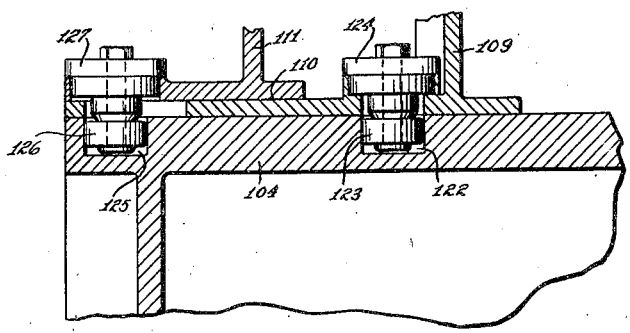

Figure 15 is an enlarged fragmental cross sectional view taken substantially along line 15—15 of Figure 2, illustrating the mounting of the driving rollers for the reciprocating heads and illustrating the rollers positioned in their respective cam grooves of the barrel cam.

Figure 16:
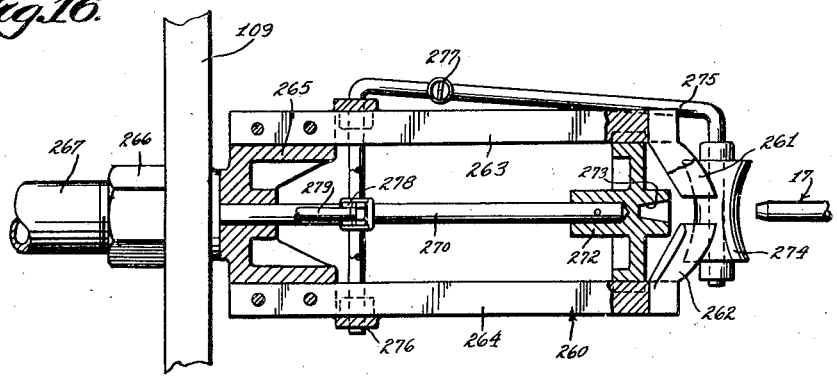

Figure 16 is an enlarged cross-sectional view taken substantially along line 16—16 of Figure 2 and illustrates the pear splitting mechanism.

Figure 17:
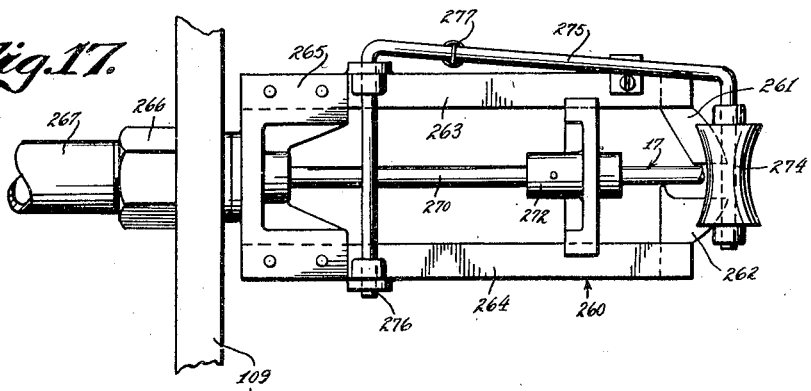

Figure 17 is an enlarged plan view of a pear slitting mechanism similar to Figure 16 but illustrating a modified set of slitting knives whereby the seed pod of the pear is sliced by only one of the knives.

Figure 18:
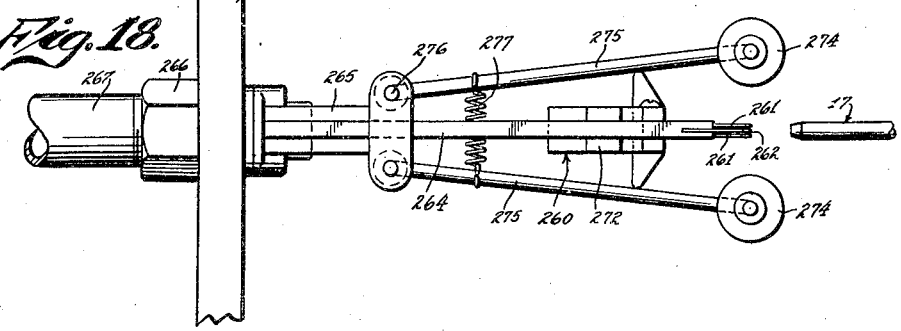

Figure 18 is a top plan view of Figures 16 and 17.

Figure 19:
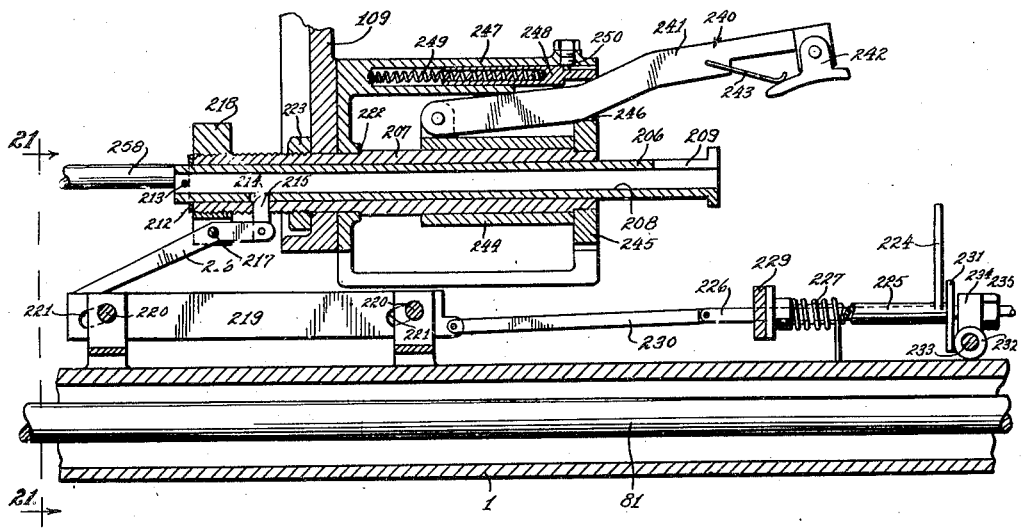

Figure 19 is an enlarged sectional view taken substantially along line 19—19 of Figure 2 illustrating the mechanism for feeding the pear into the coring and trimming knives and the release means for disengaging the feeding means when the pear has reached a predetermined setting and also illustrates the pear clamping means for holding the pear firmly yet without yielding pressure. For the sake of clearness the locking means illustrated in Figure 20 has not been included and also not all of the clamp arms have been shown.

Figure 20:
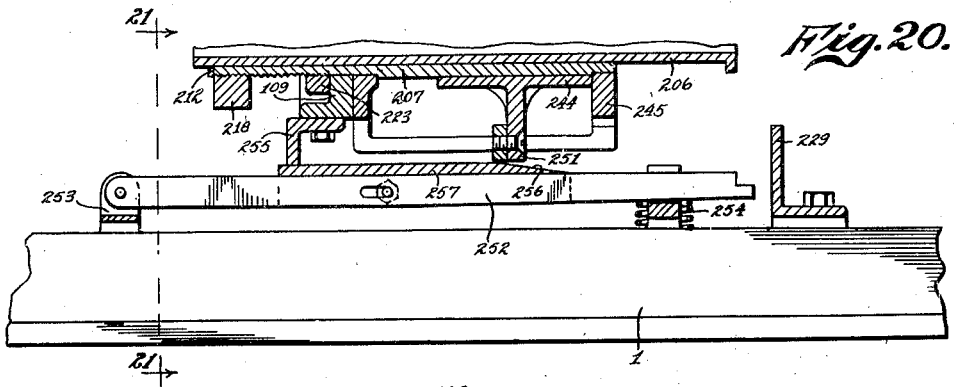
Figure 21:
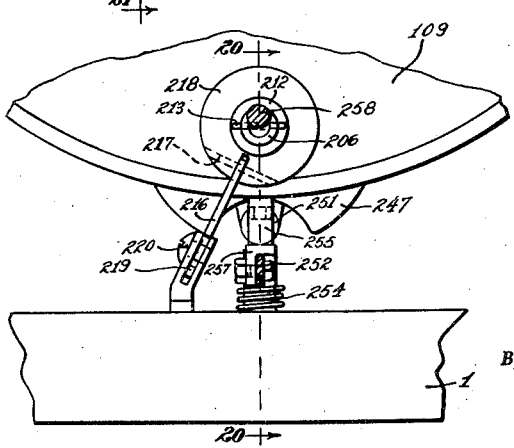

Figure 20 is a view similar to Figure 19 partially in section and taken substantially along line 20—20 of Figure 21 illustrating the mechanism for locking the coring clamp and for sake of clearness the disengaging mechanism for the pear feeding means as illustrated in Figure 19 has not been shown.

Figure 21 is a view partly in section taken substantially along line 21—21 of Figures 19—20 and illustrates the relation of the releasing and locking mechanisms with relation to each other and with relation to the coring clamp assembly.

Figure 22:
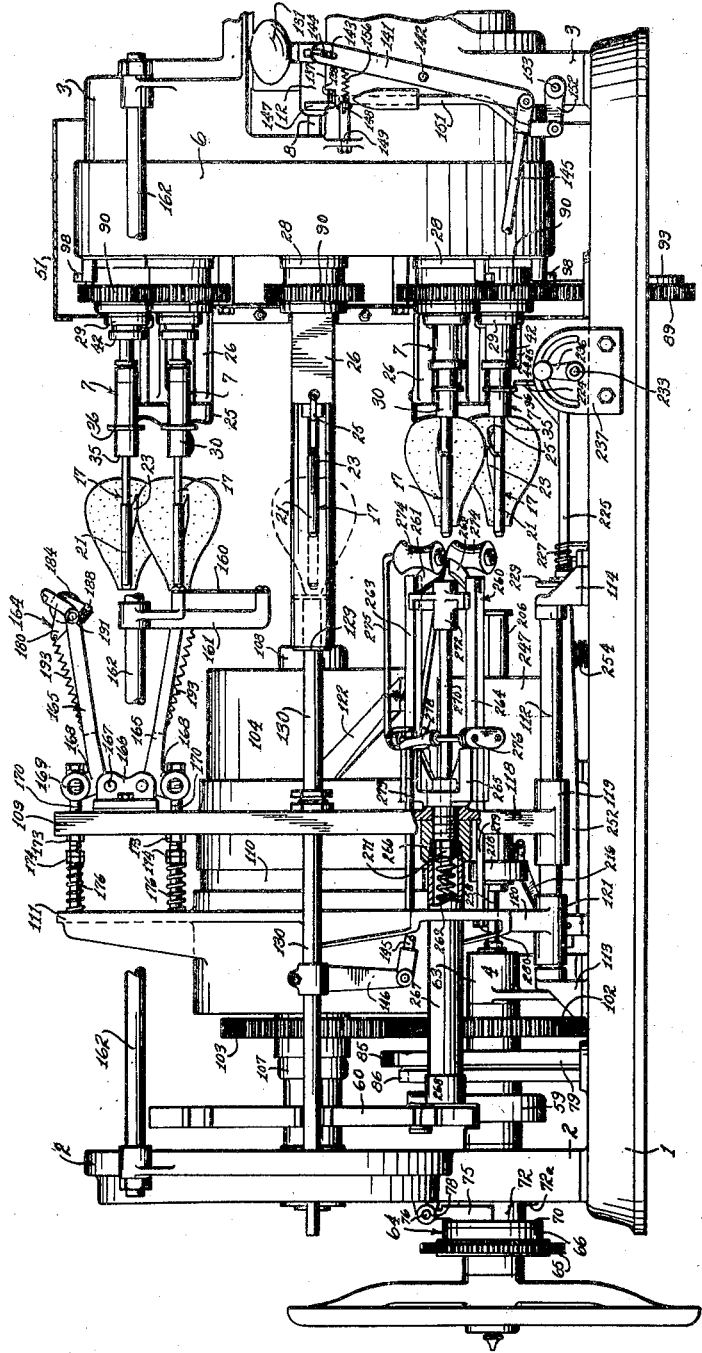

Figure 22 is a side elevational view of the machine.

Figure 1:
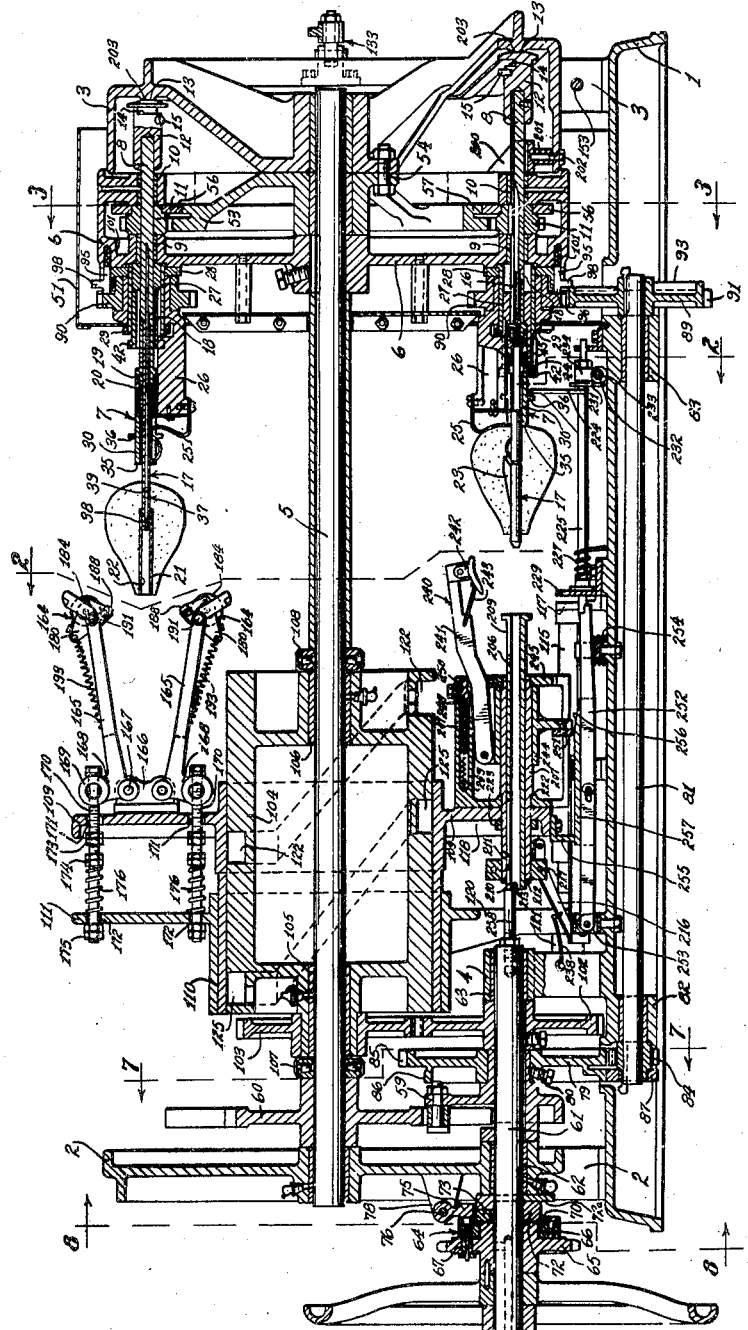
Figure 1 is a cross sectional view taken substantially along the longitudinal center line of the machine illustrating the parts of the machine in the position they would occupy just prior to being placed into operation.
Figure 23:
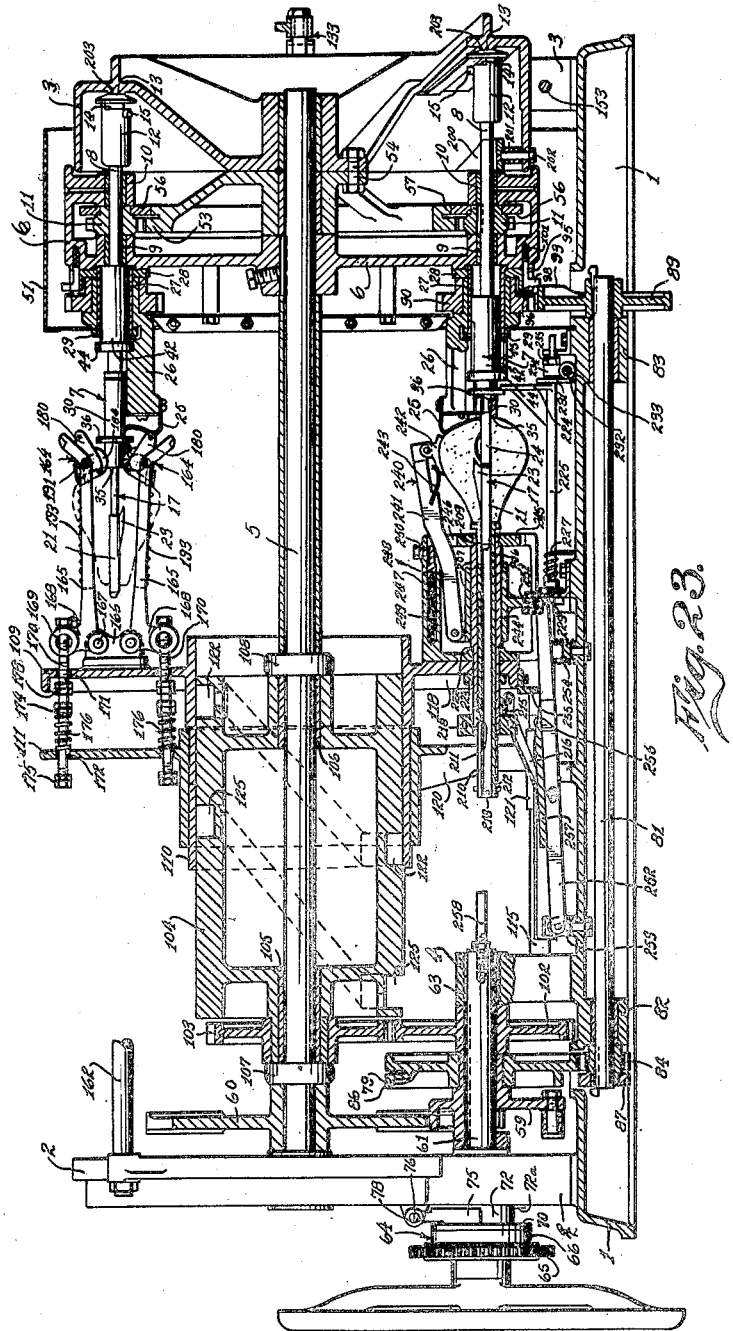

Figure 23 is a longitudinal cross sectional view similar to Figure 1 but showing the position of the parts at the end of the peeling operation and just at the starting point of the coring and trimming operation.

That form of the invention illustrated in the accompanying drawings includes a frame 1 having end brackets 2 and 3 and an intermediate drive shaft bearing bracket 4.

Journaled in end brackets 2 and 3 is shaft 5 having suitably keyed thereon adjacent the end bracket 3, a turret head 6, which is provided with eight similar spindle assemblies 7. Each spindle assembly includes a spindle 8 journaled in bearings 9 and 10 in the turret head. Keyed or splined upon spindle 8 to permit lateral movement of the spindle is the driving pinion 11 and to prevent lateral movement of the pinion it is suitably mounted between bearings 9 and 10.

The forward end of spindle 8 is provided with a spindle cap 12 having a cam surface 13, a slot 14 into which the pawl of the control handle is adapted to enter as will be described later and adjacent to slot 14 is a pin 15. The rear end of spindle 8 is bored as at 16 to receive a stemming tube 17 and a key 18 most clearly illustrated in Figure 11 causes the stemming tube to rotate with the spindle.

The extreme rear end of spindle 8 is slotted and provided with a tapered screw thread 19, a nut 20 having a like tapered screw thread is tightly screw threaded upon the spindle threads 19 thus securely clamping the stemming tube 17 in place.

The end of stemming tube 17 opposite to the end clamped in spindle 8 is provided with a stemming section 21 of slightly larger diameter than the main body of the stemming tube and section 21 is bored as at 22 to receive the stem of the pear when the fruit is impaled thereon and upon the periphery thereof an impelling blade 23 is suitably secured, which prevents rotating of the pear with relation to the stemming tube. Slidably mounted upon the stemming tube is a corer and trimming sleeve 24 which has an external diameter substantially equal to the diameter of the stemming section 21. A coring and trimming knife 25 is brazed or otherwise suitably secured to sleeve 24. To drive sleeve 24 together with the coring and trimming knife 25 a driver bracket 26 is journaled concentric with the spindle upon bearing sleeve 27 which is clamped to the face of the turret head 6 by means of flange 28. A collar 29 retains the driver bracket 26 upon the sleeve 27. A slotted guard 30 is slidably mounted upon the coring sleeve 24 and the slotted portion of guard 30 straddles the driving bracket 26 and is counterbored as at 31 to pass over the shoulder 32 of the spindle clamping nut 20. The shoulder 32 is recessed as at 33 and a pin 34 mounted in guard 30 acts in recess 33 to limit the movement of guard 30.

The guard 30 is provided with a face 35 which acts as a stop for the fruit during the peeling operation and against which the fruit engages during its movement into coring and trimming position to slide guard 30 along therewith a flange 36 is formed upon guard 30 to engage means for stopping further movement of the fruit when its blossom end has penetrated the trimming knife a predetermined amount.

A stem ejector 37 is mounted in the stemming tube 17 and spindle 8 and includes an ejector head 38 which nicely fits within the bore of the stemming tube section 21 and is actuated by an ejector rod 39 which slidably passes through the bore of stemming tube 17 and has an end bent at right angles to the rod as at 40 which projects through slot 41 of spindle 8.

Figure 9:
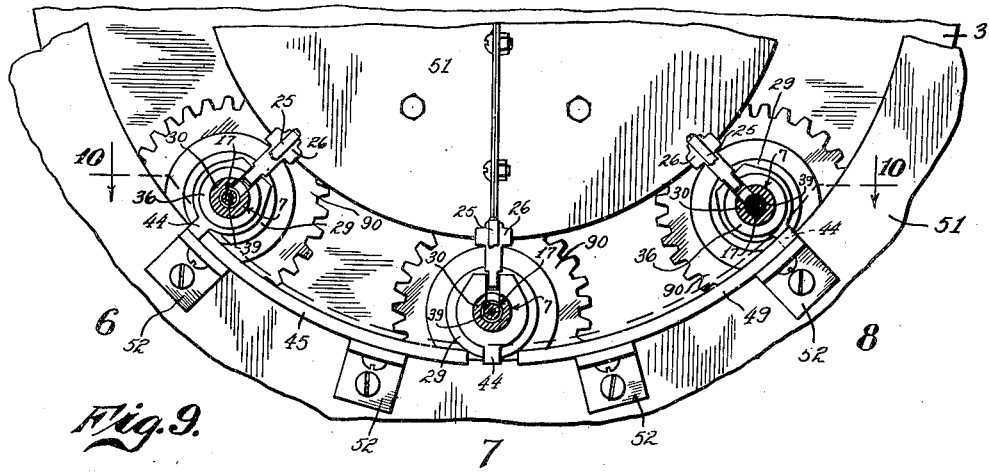
Figure 9 is a fragmental view of the lower section of the rear face of the turret head and the mounting of the two cams, one for actuating the stem ejector to eject the stem from the stemming tube while the other cam actuates the ejector back to its retracted position and also illustrates the lug of the ejector mechanism engaging with the cams.
Figure 10:
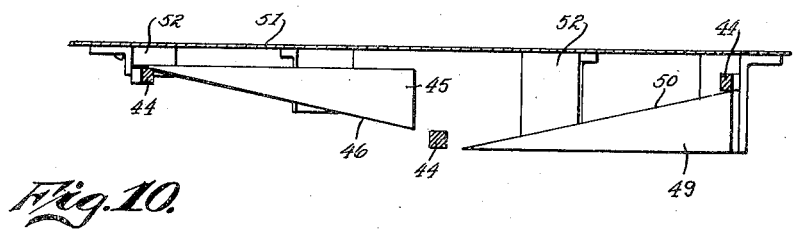
Figure 10 is a plan view of the stem ejector cams taken substantially along line 10—10 of Figure 9 and illustrating the stem ejector lugs for three different spindle positions in engagement with the cams.

To give the stem ejector the necessary lateral movement to eject the stem of the fruit from the stemming section 21 an ejector sleeve 42 is slidably mounted in the bearing sleeve 27 and also upon spindle 8 and is slotted as at 43 to straddle the driving bracket 26 as is most clearly illustrated in Figures 9 and 11 and the extreme outer end of ejector sleeve 42 is provided with a projecting lug 44. A cam 45 is positioned whereby the tapered cam surface 46 will engage lug 44 to cause the ejector sleeve to move outward. The ejector sleeve 42 is counter bored as at 47 to permit the outer end of the sleeve to slide over the guard 30, clamping nut 20 and the bent end 40 of the ejector rod however the shoulder 48 at the end of the counterbore 47 engages that portion of the bent end of the ejector rod which projects above the spindle and causes the rod to move outward forcing the ejector head 38 to the outer end of the stemming tube to eject the stem therefrom (note Figures 10 and 11). A cam 49 is positioned as illustrated in Figure 10 and is provided with a cam surface 50 having an inclination opposite to that of the cam surface 46 and as lug 44 of the ejector sleeve travels along the inclination of the cam surface 50 the ejector sleeve is returned to its retracted position.

The cams 45 and 49 may be mounted upon the turret guard 51 by means of suitable brackets 42. The turret guard 52 is stationary and is mounted upon frame 1, however the ejector operating cams 45 and 49 may be mounted directly upon frame 1 if desired. It should be noted that cams 45 and 49 are circular in form having a center of curvature coincident with the center of rotation of the turret.

As has been previously stated, each of the spindle assemblies is identical and are equally spaced around the turret head equidistant from its center of rotation so that a mutilated gear means 53 may be utilized to give the spindles the desired amount of rotation between each operating position.

Figure 3:
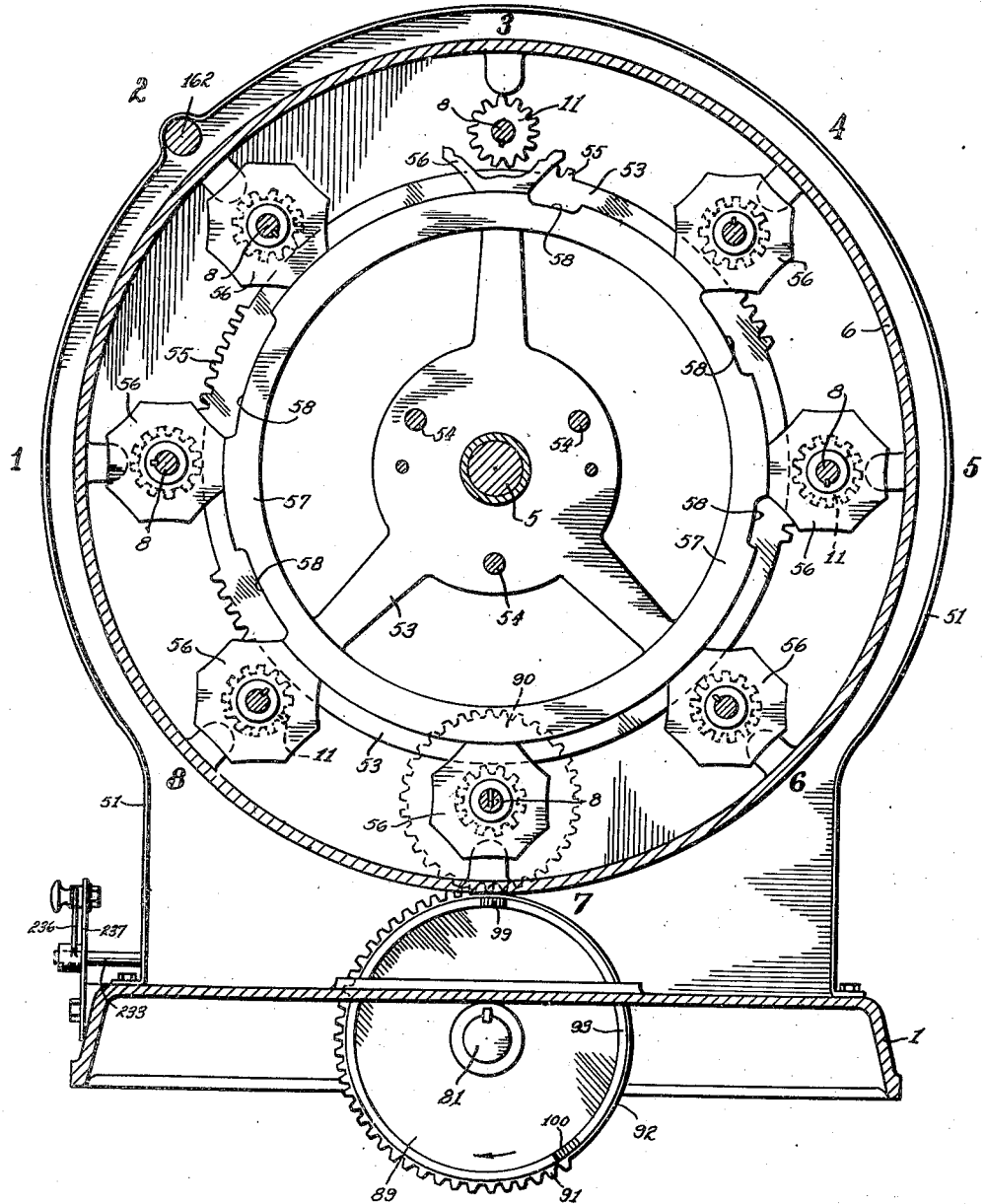
Figure 3 is a sectional view taken substantially along the line 3—3 of Figure 1 and looking in the direction of the arrows and illustrating the rotating and locking means for the turret spindles.
Figure 4:
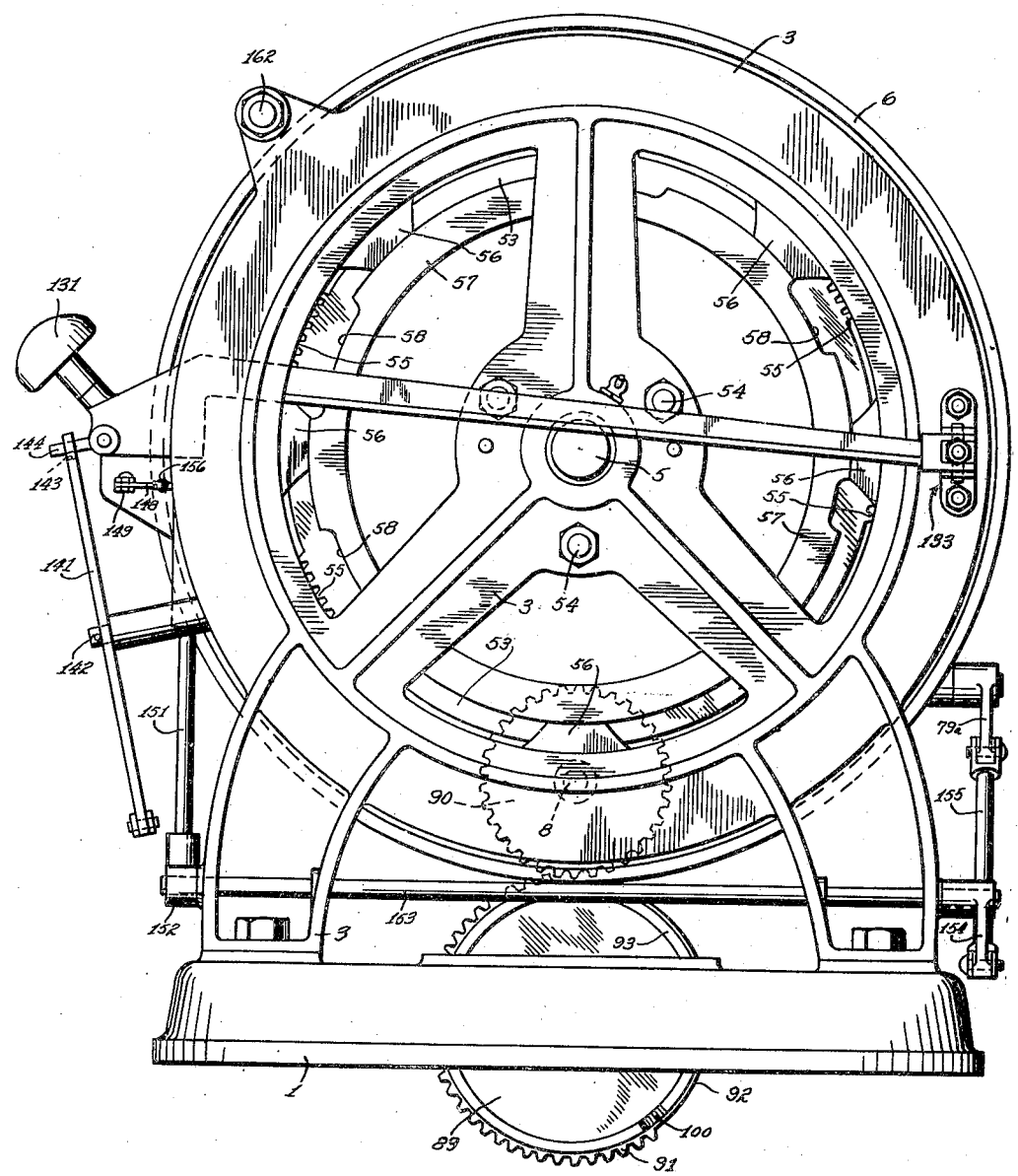
Figure 4 is a front end view of the machine as illustrated in Figure 1.

The mutilated gear 53 remains stationary and is secured to the end bracket 3 by means of bolts 54, (note Figures 1, 3, 4). By referring especially to Figure 3, it will be observed that the mutilated gear is provided upon its periphery with groups of gear teeth 55 positioned to engage the gear teeth of the spindle drive gear 11, and may be arranged to rotate the spindle while traveling from position 1 to position 2, ⅝ of a revolution and while traveling from position 2 to position 3, no rotation, and while traveling from position 3 to position 4, ¼ of a revolution, and from position 5 to position 6, ¼ of a revolution, and while traveling from position 6 through position 7 to position 8, no rotation. It is desirable to lock the spindles 8 against rotation while the groups of teeth 55 of the mutilated gear are out of engagement with the spindle driving gear 11 and for this purpose each of the spindle driving gears 11 is provided with an octagonal locking disc 56 which may be suitably secured thereto, while the mutilated gear 53 is provided with a cooperating locking ring 57 which is relieved as at 58 to permit rotation of pinion 11 together with the locking disc 56.

As illustrated in Figure 3, there are eight positions of the turret head 6 and each time the machine is operated each spindle advances one position so that it requires eight operations to cause the turret head to make a complete revolution. The turret head is rotated ⅛ of a revolution at the very start of the operating cycle, then remains stationary during the peeling, coring, trimming and slicing operations. To rotate the turret head ⅛ of a revolution each time the machine is operated the well known form of Geneva gear as illustrated in Figures 1, 7, 8, 22 and 23 is employed and includes the usual form of Geneva driver 59 mounted on the main drive shaft, which engages and rotates the Geneva driven member 60, which is operatively mounted upon the shaft 5 and when out of driving engagement, the Geneva driver locks the Geneva driven member from further rotation. For conveniences of illustration, the Geneva gear has been illustrated in Figures 2, 7, 8 and 22 in the position it would occupy after having rotated substantially one half of its rotation during the first portion of the operating cycle of the machine.

The Geneva driver 59 is keyed upon the main drive shaft 61 which is journaled in end bracket 2 in bearing 62 and in the intermediate bracket 4 in bearing 63.

The main drive shaft 61 is provided with a one revolution clutch 64, that is, a clutch which when actuated will make a complete revolution and then automatically release, whereby the machine is driven through a complete operating cycle and then is automatically stopped until the clutch is again actuated to operate the machine throughout the next operating cycle.

Figure 7:
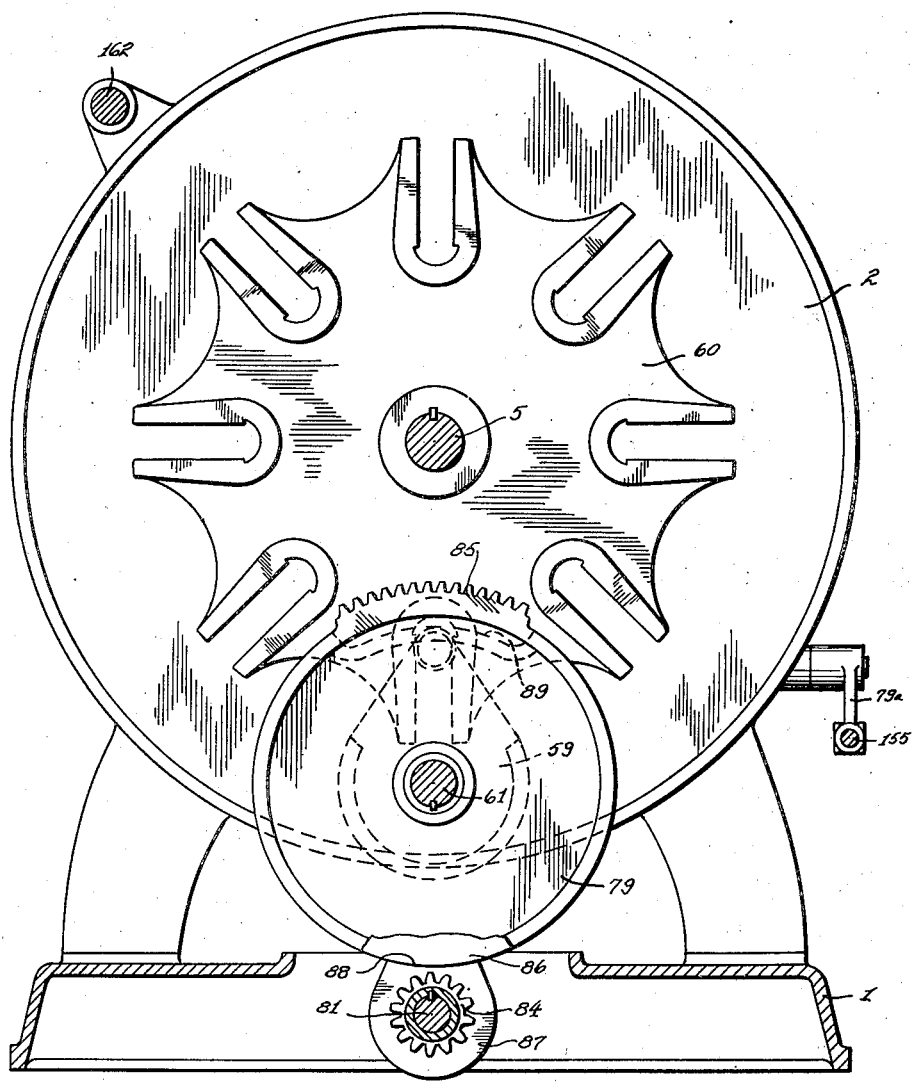
Figure 7 is a sectional view taken substantially along line 7—7 of Figure 1 and illustrates the Geneva gear arrangement for turning the turret head one-eighth of a revolution for each operating cycle and also illustrates the intermittent drive and locking means for the knives for coring and trimming the bud end of the pear.
Figure 8:
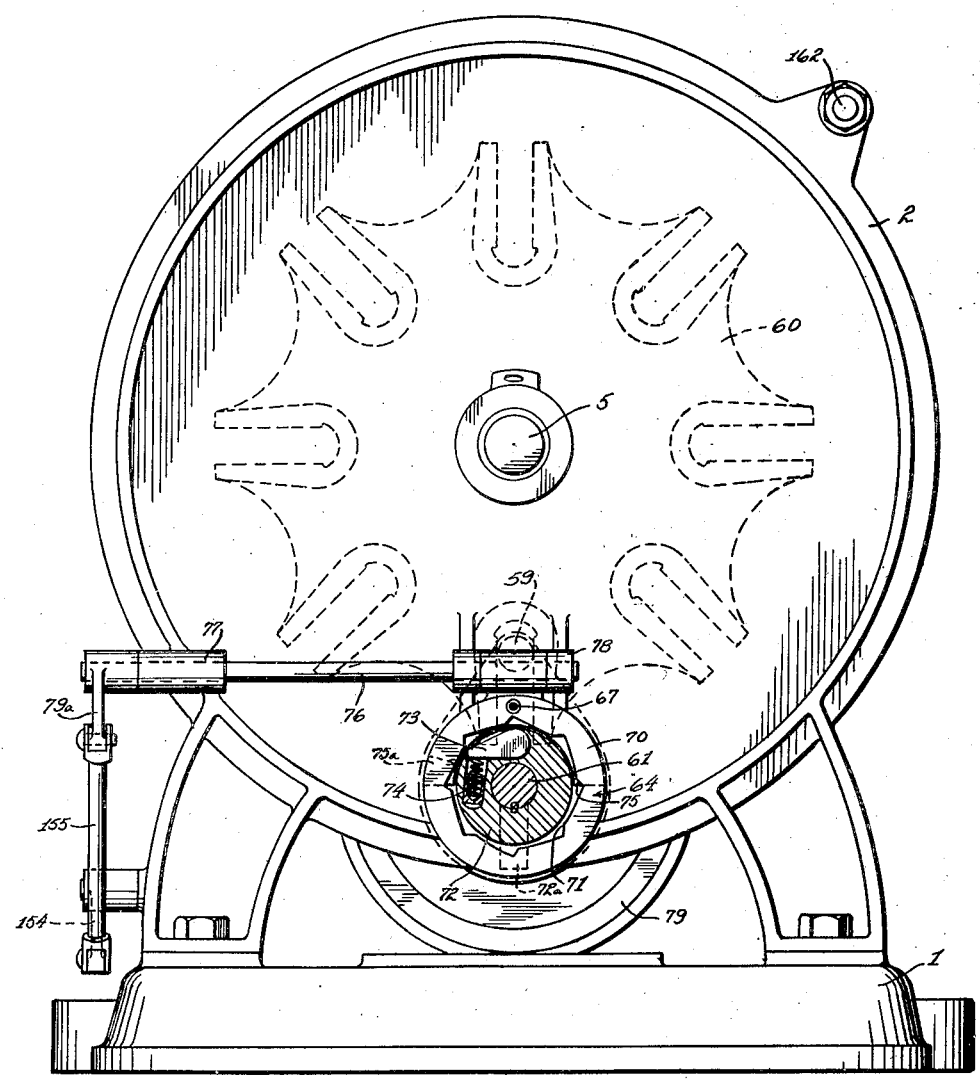
Figure 8 is a sectional view taken substantially along line 8—8 of Figure 1 and illustrating the driving clutch, and the clutch disengaging means whereby the clutch is permitted to make only one complete revolution each time it has been actuated.

The clutch 64 is illustrated in detail in Figures 1 and 8 and includes a sprocket 65 or other suitable driving means journaled upon the main driving shaft 61 and is provided with a clutch ring 66 journaled upon the hub of the sprocket and keyed thereto by means of a shear pin 67 which passes through a hardened bushing 68 in the sprocket and through a hardened bushing 69 in the clutch ring so that in case the machine should become clogged the shear pin 67 would be sheared thus freeing the sprocket and preventing damage to the machine. Secured to the clutch ring 66 is an annular clutch plate 70 which is provided upon its inner surface with a series of ratchet teeth 71. The portion of the clutch just described constitutes the driving elements of the clutch while the driven elements of the clutch include a hub 72 suitably keyed to shaft 61 and extending into the bore of the clutch plate 70. A clutch dog 73 is operatively mounted in the hub 72 and a spring 74 continuously urges the outer end of the clutch dog toward the clutch ring 70. In order to retain the clutch dog in a retracted position as illustrated in Figure 7, a clutch yoke 75 straddles the hub 72 and holds the clutch dog out of engagement with the clutch plate 70. The clutch yoke 75 is suitably secured upon rocker shaft 76 which is journaled upon end bracket 2 in bearings 77 and 78 and by rotating the rocker shaft by means of the lever arm 79a the clutch yoke 75 is moved out of engagement with the clutch dog 73 and the spring 74 forces the clutch dog into contact with one of the ratchet teeth 71 of the clutch plate thus causing the hub 72 to rotate and as the hub is keyed to the main driving shaft 61 the machine is operated. To disengage the clutch after shaft 61 has made a complete revolution the clutch yoke 75 is to return by means of the lug 72a secured to or formed integral with the hub 72 which during the rotation of the hub engages with the tapered cam surface 75a of the clutch yoke 75 to positively shift the clutch yoke to its initial position so that upon completion of a single revolution of the shaft the clutch dog 73 is engaged by the clutch yoke 75 and is thereby forced out of engagement with the clutch plate 70 and is held retracted until the clutch yoke 75 is again removed.

As previously pointed out, the Geneva gear driver 59 is keyed upon the main driving shaft 61 so that each time shaft 61 makes a complete revolution the Geneva driver engages one of the driving slots in the Geneva driven member and as there are eight driving slots the Geneva driven member is rotated ⅛ of a revolution per revolution of shaft 61.

A mutilated gear 79 for driving the coring and trimming knives is suitably mounted upon the main driving shaft 61 or as illustrated in Figure 1 the mutilated gear 79 fits tightly upon the extended hub of the Geneva driver 59 and is secured thereto by means of a set screw 80. A longitudinal shaft 81 is journaled upon the underside of frame 1 in bearings 82 and 83 and keyed to the rear end thereof is a pinion 84 positioned to be engaged by the teeth 85 of the mutilated gear 79. As illustrated most clearly in Figure 7, the mutilated gear 79 is provided with gear teeth 85 which are just sufficient in number to rotate pin 84 one complete revolution for each revolution of the mutilated gear. The longitudinal shaft 81 is locked against rotation during the time teeth 85 of the mutilated gear 79 are out of mesh with the teeth of pinion 84 by means of the locking ring 86 secured to or formed integral with the mutilated gear 79 while suitably mounted upon the hub of pinion 84 is a cooperating locking disc 87 provided with a cutaway portion 88 which is shaped to nicely fit the periphery of the locking ring 86. (Note Figure 7.) The locking ring 86 has a cutaway or relieved section 89 adjacent teeth 85 of the mutilated gear 79 to permit the rotation of the locking disc 87 when teeth 85 engage and rotate pinion 84.

Suitably keyed upon the forward end of the longitudinal shaft 81 is the mutilated intermediate corer gear 89 (Figures 1, 3, and 4), and is positioned to operatively engage the corer pinion 90 which is keyed upon the driver bracket 26. The mutilated intermediate corer gear 89 is provided with the required number of teeth 91 to cause the corer pinion 90 to make one complete revolution for a single revolution of gear 89, and as gear 89 is of greater diameter than the corer pinion 90 the teeth 91 do not extend completely around the periphery of gear 89 thus leaving the blank portion 92 around a section of the periphery of the gear and this blank portion permits the corer pinion to be carried by the turret head 6 into position to be engaged by the teeth 91 and also permits sufficient rotation of gear 89 to enable the cylindrical cam 93 which may be secured to or formed integral with gear 89 to engage and unlock the corer pinion locking means before teeth 91 operatively engage the teeth of the corer pinion. The locking means 94 for each corer pinion includes (Figures 1 and 11) a latch 95 slidably mounted in the flange 28 and turret head 6 and is provided with a projection 96 which is adapted to engage the slot 97 of the corer pinion 90 to lock the pinion against rotation. The latch 95 is provided with a depending lug 98 which extends beyond the teeth of the corer pinion and is in alignment with the cylindrical cam 93 which is provided with an inclined cam surface 99 positioned with relation to teeth 91 of the mutilated intermediate corer gear 89 to move the projection 96 of the latch out of engagement with the slot 97 of the corer pinion 90 just at the point teeth 91 engage the teeth of the corer pinion and after the corer pinion has been rotated one complete revolution and just as teeth 91 of the mutilated intermediate corer gear 89 moves out of engagement with the teeth of the corer pinion 90 the lug 98 of latch 95 rides down the inclined cam surface 100 permitting the latch to carry the projection 96 into engagement with the slot 97 of the corer gear to again lock the gear against further rotation.

A latch spring 101 constantly urges the latch 95 into engagement with the corer pinion 90 and thus the pinion is locked against rotation until the latch is again withdrawn.

There is also suitably mounted upon the main driving shaft 61 a cam driving gear 102 which meshes with and drives a cam gear 103 of equal diameter, which is mounted upon and keyed to one of the hubs of a barrel cam 104 which is journaled upon the turret rotating shaft 5 in bearings 105 and 106 and is retained against lateral movement thereon by thrust bearings 107 and 108 and as the cam driving gear 102 is rotated one complete revolution each time the clutch 64 is actuated and as the cam gear 103 is of equal diameter, the barrel cam 104 is likewise rotated one revolution each time clutch 64 is actuated.

Slidably mounted upon the barrel cam 104 is the reciprocating head 109 (Figures 1, 2, and 15) and slidably mounted upon the cylindrical portion 110 of the reciprocating head is a somewhat similar auxiliary head 111. It is necessary to provide means for supporting the reciprocating head 109 and auxiliary head 111 against rotation, and for this purpose one or more guide rods may be provided, as illustrated in Figures 1, 2 and 22 which may include a guide rod 112 supported above and at one side of frame 1 in brackets 113 and 114 while at the opposite side of frame 1 the guide rod 115 is likewise supported by brackets 116 and 117. The reciprocating head 109 is provided at each side with depending feet 118 each of which is provided with a cylindrical bearing 119 which are slidably mounted upon respective guide rods 112 and 115 (Figures 2 and 22).

And likewise the auxiliary head 111 is provided at each side with depending feet 120 provided with cylindrical bearings 121 slidably mounted upon the guide rods 112 and 115. It should be remembered that each head is free to reciprocate independently of the other and in order to independently reciprocate the heads the barrel cam 104 is provided with a continuous cam groove 122 (Figures 1, 15, and 23), which is spiral with interposed radial sections. A roller 128 rotatively mounted upon flange 124 which is bolted to the reciprocating head 109 (Figures 2 and 15) travels in the cam groove 122. A similar continuous cam groove 125 having a slightly longer spiral section and correspondingly slightly shorter radial sections is provided around the periphery of the barrel cam 104 and a roller 126 is rotatively mounted upon the flange 127 which flange is bolted to the auxiliary head 111 (Figure 15), and is positioned to travel in the cam groove 125. Due to the difference in length of the spiral sections of the cam grooves 122 and 125 the auxiliary head will start to travel shortly before the reciprocating head 109 will start to move and will travel a little further and the auxiliary head 111 will start upon its return movement shortly before the reciprocating head 109 will start upon its return movement and the auxiliary head will necessarily travel further to reach the initial starting point. The purpose for the relative movement between the reciprocated head 109 and the auxiliary head 111 will be described later.

The description of the remaining portion of the machine will be more easily understood when described along with the operation of the machine and therefore the operation of the machine will now be described.

As previously stated, the machine completely prepares the fruit by first removing the stem then by removing the skin of the fruit by passing the fruit through four different peeling operations, then coring and trimming the blossom end and finally slicing the fruit.

Each piece of fruit passes successively through eight positions or stations in the machine at which stations different portions of the paring operation is performed. For example, at the first station, the incoming piece of fruit is impaled upon the stemming tube 17 and as the fruit travels between the first and second stations, the stem of the fruit is removed, while at the third, fourth, fifth and sixth stations the peeling operations are performed, at the seventh station the core or seed pod is cut from the pear and also the blossom end is trimmed and peeled and finally at the eighth station the fruit is sliced and leaves the machine.

The operation of the machine will now be described from the placing of the fruit into the machine until the fruit leaves the machine completely prepared.

The first operation is to place the pear into the machine at the first station of the turret head 6 (Figures 2, 3, and 22) this first operation is accomplished by placing the stem of the pear into the V shaped notch 128 formed in the disc 129 which is mounted upon the forward end of stem holder rod 130 which is slidably mounted in the end bracket 2 and the reciprocating head 109. Next the stemming tube is carried toward the blossom end of the pear by spindle 8 which at this station is connected to the control handle 131 by the pawl 132 engaging the slot 14 of the spindle cap 12 (Figures 5 and 6).

It will be noted that as the control handle 131 is moved toward the left that the stem holder rod 130 and disc 129 are simultaneously moved to the right. And as illustrated in Figure 22, the stemming tube and stem holder rod are shown in full lines in the retracted position and in broken lines in the position when the pear is fully impaled.

To actuate the stem holder rod simultaneously with the control handle 131 the lever 141 is pivoted at 142 to the end bracket 3 and at its upper end is provided with a slot 143 through which the projection 144 of the pawl 132 of the control handle extends while to the lower end of lever 141 one end of the rod 145 is pivotally secured. The stem holder rod 130 is provided with a depending arm 146 to which the other end of rod 145 is pivotally secured.

As the stemming tube and the blossom end of the pear approach each other the blossom end of the pear is held so that it will be centrally engaged by the stemming tube to insure a clean removal of the stem or core.

The operation of the control handle 131 is continued until the pear has been impaled as indicated in broken lines in Figure 22 at which point the pin 15 of the spindle cap 12 engages the upstanding portion 147 of the pawl 148 which is pivoted to a bracket 149 secured to the end bracket 3, to swing the pawl 148 out of the notch 150 cut into the clutch actuating rod 151 to unlock the clutch actuating rod 151 so that the control handle 131 which now has reached the end of its lateral movement may be actuated downward and to permit the downward movement of the control handle the slideway 137 through which the control handle extends is provided with a notch 138 and also as illustrated in Figure 4 the control handle 131 is provided with a double pivotal mounting 139. As the clutch actuating rod 151 has now been unlocked the control handle 131 as it is actuated downward engages and moves downward the clutch actuating rod. The motion thus given to the clutch actuating rod 151 is transmitted through the lever 152, cross shaft 153, lever 154 and by the rod 155 to the lever 79ᵃ mounted upon the outer end of the clutch yoke rocker shaft 76 to swing the clutch yoke 75 out of engagement with the clutch dog 73 to thus place the one revolution clutch into operation and as the turret head 6 is rotated during the initial operating period of the machine the spindle which was in engagement with the control handle and the pin 15 which acted to unlock the clutch actuating rod are moved away from station 1 and the locking pawl 148 is returned by the action of the spring 156 to engage the notch 150 to lock the clutch actuating rod 151 to prevent the clutch from being actuated a second time during an operating cycle.

It will be noted that the pawl 148 is moved to unlock the clutch actuating rod 151 by the spindle cap pin 15 and therefore the rod 151 remains locked until the next spindle is engaged by the pawl 132 and moved until the pin 15 again engages and releases the locking pawl 148.

The pawl 132 is pivotally mounted in the control handle so that when the turret head is rotated and when the next spindle moves into station 1 the cylindrical surface of the spindle cap 12 will engage and carry upward the projecting end of pawl 132 as illustrated in broken lines in Figure 6, and upon movement of the control handle to the right the pawl will slide along the cylindrical surface of the spindle cap until the pawl drops into the spindle cap slot 14 whereby the spindle will be locked to the control handle 131 and will move with the control handle either to the right or left until the clutch is again actuated and consequently the spindle moved away from the impaling station.

After the pear has been impaled and the clutch 64 thrown into action by the control handle 131 the main driving shaft 61 will be driven by clutch 64 through one complete revolution and upon the completion of the single revolution of shaft 61 the clutch is automatically released to stop further rotation of the shaft.

During the first part of the revolution of the main driving shaft 61 the Geneva driver 59 engages and rotates the Geneva driven member 60 just one-eighth of a revolution and as the Geneva driven member 60 is fixed upon shaft 5 the turret head 6 which is likewise fixed upon shaft 5 is also rotated one-eighth of a revolution to carry the spindle 8 upon which the pear has been impaled from the first station to the second station and by referring to Figure 3 it will be observed that spindle 8 and thereby the stemming tube 17 will be rotated as it travels from the first to the second station by the series of gear teeth 55 positioned upon the periphery of the mutilated gear 53 which will engage the teeth of spindle driving pinion 11 and that the octagonal locking disc 56 will be free to rotate in the relieved portion 58 of the locking ring 57. The amount of rotation of the spindle of course is governed by the number of teeth placed upon the mutilated gear 53 however in the present instance sufficient teeth have been provided to rotate the spindle exactly ⅝ of a revolution and as the spindle driving pinion leaves the teeth 55 the locking disc 56 again engages the locking ring 57 to lock the spindle against further rotation.

As the pear travels from the first to the second station the stem and a predetermined portion of the stem end of the pear are removed by a stem cutting knife 160 (Figures 2 and 22) which may be mounted upon a bracket 161 which in turn is fixedly mounted upon the tie rod 162 which is secured to and also acts as a brace for the end brackets 2 and 3. It will be noted that the rotation of the spindle 8 upon which the fruit has been impaled occurs at the time the stem end of the pear is presented to the cutting edge of the stem cutting knife 160 which insures a clean cut without injury to the fruit.

The impelling blade 23 formed upon the stemming section 21 of the stemming tube 17 insures the rotation of the pear with the spindle 8.

After the stem cutting knife 160 has removed the stem and a portion of the stem end of the pear the pear is carried to the second station where the pear remains without further paring action and the machine automatically stops upon completion of its operating cycle.

The next step in the preparation of the pear may now be started by actuating the control handle 131 to impale a fresh pear in the machine and to actuate the clutch 64 to start the machine upon another operating cycle. The Geneva gear will be again actuated to rotate the turret head 6 through one-eighth of a revolution which will carry the pear to the third station where the first peeling operation takes place. Before describing the peeling knives, and the mechanism for actuating the peeling knives, attention is directed to Figure 3 wherein it will be observed that the mutilated gear 53 is not provided with teeth between the second and third stations and that the octagonal locking disc 56 remains in locking engagement with the locking ring 57 for the entire distance between these two stations, thus locking the spindle assembly 7 against rotation with respect to the mutilated gear 53. From the following Figures 1, 2, 12, 13, 14, 22, and 23, it will be observed that each peeling station is provided with a pair of peeling knife assemblies 164 and that each of the peeling knife assemblies is pivotally mounted upon the end of a yoke 165 which is fulcrumed upon bracket 166 as at 167. Each bracket 166 is bolted upon the forward face of the reciprocating head 109, and each of the yokes 165 is provided with bifurcated arm 168 having a pivotally mounted trunnion block 169 and suitably secured to each trunnion block is the actuating rod 170 which extends rearwardly through the opening 171 in the reciprocating head 109 and through a similar opening 172. Each of the actuating rods 170 is provided with three sets of adjusting nuts 173—174 and 175 and also with a spring 176. The adjusting nuts 173 limits the closing movement of the yokes 165 toward each other so that the position of the knife assemblies when closed is such that the peeling knives will clear the stemming section 21 and the impelling blade 23 to prevent possible damage to the peeling knives.

The adjusting nuts 174 regulate the tension of spring 176.

While the adjusting nuts 175 regulate the distance the peeling knife assemblies 164 move apart.

Each peeling knife assembly 164 (Figures 12, 13, and 14) include two end frames 180 with rods 181 and 182, tying the frames together, the rod 182 acting as a shaft for the eccentric bushing 183 upon which the guard roller 184 rotates, a disc 185 with equally spaced notches 186 in its periphery is fixed to the eccentric bushing 183 and a spring pawl 187 suitably fastened to one of the end frames 180 engages a selected notch so as to lock the eccentric bushing 183 at a predetermined or selected adjustment to regulate the distance between the guard roller 184 and the peeling knife 188. The peeling knife 188 is a flat strip of suitable metal sharpened on one edge and concaved intermediate the ends which are bent at right angles and slotted as at 189 to provide an adjustment between the knife 188 and the end frames 180 to which it is clamped by screws 190.

It is an important feature of this invention to mount each peeling knife assembly 164 so as to obtain what may readily be termed a castor action whereby the peeling knife 188 upon engaging the fruit will be retarded causing the peeling knife assembly 164 to swing until the guard roller 184 will engage and follow the contour of the fruit and as the roller follows the contour of the fruit the peeling knife assembly is likewise caused to follow the contour of the fruit thus enabling the peeling knife 188 to make an even clean cut thereacross. To obtain this castor action, that is, the co-joint action of the knife and roller, each peeling knife assembly is pivotally mounted upon one of the yokes 165 so that the pivot pins 191 mounted upon the outer end of the yoke operatively engage the peeling knife assembly at a point 192 located in each frame 180 above the center line of the guard roller 184 and above the cutting edge of the peeling knife 188 and nearer to the guard roller assembly than to the knife edge. And to cause the proper amount of pressure to be applied by the knife edge and the guard roller against the object to be peeled two springs are provided, the first spring 193 acts to urge the peeling knife against the fruit and therefore one end of spring 193 is fixed in the spring groove 194 of rod 181 of the peeling knife assembly while the opposite end is anchored to the yoke.

To prevent the peeling knife assembly from being rotated beyond a predetermined point by the action of spring 193 each frame 180 is provided with a stop pin 195 positioned to engage the yoke 165 when the predetermined position has been reached (Figures 1 and 12).

The second spring above referred to for causing the proper amount of pressure to be applied to the knife edge and guard roller against the object to be peeled is the spring 176 mounted upon the actuating rod 170 and as previously stated adjusting nuts 174 may be adjusted to control the amount of pressure to be exerted by the spring 176.

It is necessary to, as we may term, close the peeling means to engage the fruit to be peeled and then to cause the peeling means to move or travel forward until the peeling knives 188 come into contact with the cut end of the pear and cause the pear to slide on the stemming tube until the blossom end comes against the face 35 of the guard 30 (Figures 1 and 23) and then to cause the knives to continue to advance across the fruit so as to take a cut or peel the portion of the fruit engaged by the peeling knives and then at the end of the peeling operation to open the peeling means, and then to return the peeling means to their initial starting positions, note Figure 1 in which the peeling means are illustrated in an open position while in Figure 23 the peeling means in a closed position at the completion of the peeling operation.

The actuation of the peeling means is controlled by the reciprocating head 109 and the auxiliary head 111 as follows: When clutch 64 has been actuated the barrel cam 104 is rotated through a complete revolution as has been previously described, and as the first portion of the cam grooves 122 and 125 are annular the heads 109 and 111 remain stationary, it is during this period that the turret head 6 is rotated one-eighth of a revolution, the spiral portion of the cam groove 125 starts shortly before the spiral portion of the cam groove 122 and therefore the auxiliary head 111 moves first and this initial relative movement between the heads 109 and 111 closes the peeling means by forwardly moving the actuating rods 170 by compressing spring 176 between the auxiliary head 111 and the adjusting nuts 174 (note Figure 23) and when the peeling means have been closed, the spiral portion of the cam groove 122 moves the head 109 along the barrel cam 104 and as the slope of the spiral portion of each cam groove is of the same pitch the two heads 109 and 111 move in unison along the barrel cam until the peeling means have been moved across the fruit to be peeled, as illustrated in Figure 23. At this point the spiral portions of the two cam grooves develop into a second annular section of the cam grooves 122 and 125 to stop further movement of the heads and after a short pause, the second spiral section of the cam groove 125 causes the auxiliary head 111 to move backward to engage the adjusting nuts 175 of the actuating rods 170 to move the actuating rods to open the peeling means and when the peeling means have opened the second spiral section of cam groove 122 causes the reciprocating head to move backward with the head 111 until the position of the heads, as illustrated in Figure 1, is reached which is the end of the operating cycle and the machine automatically stops.

The peeling operation just described is repeated at the 4th, 5th, and 6th stations. The object to be peeled is rotated a quarter of a revolution between the 3rd and 4th stations and ⅜ of a revolution between the 4th and 5th stations, and finally ¼ of a revolution between the 5th and 6th stations, in order to present to the peeling knives all sides of the pear and as the pear leaves the 6th station, it is completely peeled with the exception of the blossom end of the pear which has been covered by the guard 30.

Upon the next operation of the machine, the pear is moved from the 6th to the 7th station where the coring and trimming of the blossom end of the pear takes place. In traveling from the 6th to the 7th station, the stemming tube 17 and the guard 30 are caused to move endwise toward the turret sufficiently to have the guard 30 uncover the coring knife 25. This movement is accomplished by the cam 200 which is suitably mounted upon the end bracket 3 by the spacing tube 201 and bolts 202 and is positioned in the path of travel of the spindles 8 whereby the point of the cam 200 is engaged by the enlarged head of the spindle cap 12 and as the spindle travels the cam 200 causes the spindle 8 and the guard 30 to move endwise to uncover the coring knife 25. The turret head cam 203 against which the cam surface 13 of the spindle cap 12 slides (Figure 1) is displaced laterally between station 6 and 7 to permit the withdrawal of the spindle as above described.

Between stations 6 and 7, the stem ejector 37 is actuated to eject the stem of the pear which has been impaled in the stemming section 21 of the stemming tube 17, by the engagement of the projecting lug 44 of the ejector sleeve 42 with the ejector cam 45 (Figures 1, 9, 10 and 11) to cause the bent end 40 of the ejector rod and the ejector head 38 to move to the outer end of the stemming section 21 and thereby exude the impaled stem therefrom, as has been previously described.

During the rotation of the turret from the 7th to 8th stations, the ejector sleeve lug 44 engages the cam 46 to return the sleeve to its initial position while the ejector head 38 and rod 39 are returned to their initial position when the next pear is impaled upon the stemming tube, the core acting to push the ejector head back to its initial position.

At the 7th station, the pear is first pushed along the stemming tube section 21 onto the sleeve 24 to which the coring and trimming knives are mounted and when the blossom end of the pear reaches the guard 30, it also is moved along with the pear and when the trimming blade has penetrated a predetermined distance into the blossom end of the pear, the flange 36 of the guard engages a plunger release trip to stop further movement of the pear and shortly thereafter the coring and trimming knife 25 is rotated a complete revolution by the means previously described to cut the core or seed pod from the meat of the pear, and also to trim the blossom end of the pear.

The means for pushing the pear along the stemming tube 17 and sleeve 24, until the trimming knife 25 has penetrated a predetermined depth into the blossom end of the pear, includes as illustrated in Figures 1, 19, 20, 21, and 23, a push-up plunger 206 slidably mounted in the bore of the central tube 207, and is provided with a bore 208 adapted to slide over the stemming section 21 of the stemming tube and in order that the push-up plunger will not damage the impelling blade 23, it is slotted as at 209 (Figure 1).

Adjacent the rear end the push-up plunger 206 is provided with a key slot 210 to receive the key 211 which allows a reciprocating but prevents a rotary movement thereof. The push-up plunger 206 is retained in the bore by the washer 212 and cotter pin 213. A notch 214 is also provided in the plunger 206 in which the pawl 215 engages. The pawl 215 is pivoted to the latch arm 216 which pivots on a pin 217 in the latch collar 218, which is supported upon an extension of the central tube 207. The lower end of the latch arm 216 slides on the latch slide 219 (Figures 19–21) which is supported by pins 220 fitting in the oblique slots 221 and arranged so that a forward movement of the slide 219 will cause it to raise and transmit sufficient movement through the latch arm 216 to withdraw the pawl 215 from the notch 214 and thereby releasing the plunger 206 from the central tube 207. The central tube 207 extends through an opening in the reciprocating head 109 and is suitably clamped therein by the shoulder 222 and nut 223 and consequently the central tube 207 moves with the head 109 and it is during this forward movement of the head 109 that the pawl 215 engages the notch 214 to drive the push-up plunger 206 to slide the pear along the stemming tube and when the blossom end of the pear has been pushed sufficiently the latch slide 219 is actuated to withdraw pawl 215 from notch 214 to release the plunger 206 from further forward movement.

The means for actuating the latch slide 219 to release the plunger 206 includes a plunger release trip 224 fixed to the forward end of tube 225 which is mounted upon the slide actuating rod 226. The tube and trip 224 are free to rotate upon rod 226 but is yieldingly held in position by means of the spring 227. The rod 226 upon which the tube 225 is mounted is journaled at its forward end in bracket 228 and adjacent its rear end in bracket 229 and pivotally connecting the rear end of the actuating rod 226 with the latch slide 219 is a link 230 (Figure 19), means are provided for adjusting the engagement of latch 224 with actuating rod 226 which means includes a circular plate 231 fixed to the forward end of tube 225 which is adapted to be engaged by an eccentric 232 which is mounted upon adjusting rod 233 (Figure 2). The adjusting rod 233 is journaled in the bracket 234 which in turn is journaled upon the forward end of the actuating rod 226 and held against movement thereon by means of nut 235, while at the outer end of the adjusting rod 233 is suitably mounted an adjusting handle 236 which is adapted to be locked to a quadrant 237 by any suitable form of means. By rotating the adjusting handle 236 the eccentric 232 is rotated and thereby the position of the plunger release trip 234 is adjusted in relation to the flange 36 of guard 30 and by this arrangement it is an easy matter to adjust the exact point at which the pear will be stopped so that the trimming knife 25 will penetrate the blossom end thereof to any desired depth.

A spring 238 may be provided to yieldingly retain the latch arm 216 in sliding engagement with the latch slide 219.

A pear clamping means 240 is provided to clamp the object to be cored and trimmed firmly, yet without yielding pressure such as a spring clamp would give. The clamp consists of four arms, 241 and to each is pivoted a clamp block 242 and a spring stop 243 retains the clamp blocks in proper position. Each clamp arm 241 is pivoted to the clamp spider 244, which slides on the central tube 207. The end plate 245 is fixed to the outer end of the central tube 207 and is provided with a radial slot 246 for each arm. The radial slots 246 act as guides for arms 241 while the inner ends of the slots act as cam points. A shell 247 is cylindrical in shape and is clamped in position on the central tube 207 by the shoulder 222 and is provided with four plungers 248 positioned to engage the arms 241 and which are held outward by the tension of the plunger spring 249 and each plunger is provided with a stop 250.

During the forward movement of the reciprocated head 109, the pear is first pushed into position by the means already described and also during this forward movement of the head 109, the clamping means 240 is likewise carried forward and when the clamping blocks 241 have reached the proper position (Figure 23) with relation to the coring and trimming knives 25 and also the pear, the projection 251 of the clamp spider 244 comes into contact with the stop bracket 229 arresting further forward movement of the spider 244 relative to the clamp assembly, while further forward movement of the reciprocating head 109 permits the arms 241, to swing to a common center, if not held from contracting by a pear will contract to form a pocket that will just clear the corer knife 25 and impelling blade 23. If a pear is in the coring position, the arms 241 will swing until they come in contact with the pear and will be held thereby from further inward movement and consequently as the clamping assembly moves further forward the plunger 248 will be held from further forward movement by the arms 241 and the plunger 248 due to the action of the plunger spring 249 will exert a slight pressure upon the arms and thereby upon the clamp blocks 242. This gives the effect of a self-locking clamp with each of the four arms separately controlled to take care of any irregular shaped pears. After the pear is firmly clamped which occurs at the extreme forward movement of the reciprocating head 109 and during the interval when the head 109 is stationary the teeth 85 of the mutilated gear 79 come in mesh with the teeth of the pinion 84 which as described heretofore causes the intermediate corer gear 89 to release the latch 95 by means of the cam 93 and revolve the corer gear pinion 90 and its assembly one revolution to sever the core or seed pod from the meat of the pear and trimming the blossom end of the pear to the shape of the trimming knife, and thereby removing the unpeeled portion of the pear. Upon completion of the coring and trimming operation the return stroke of the reciprocating head 109 causes the clamp to open by retaining the clamp spider 244 from returning with the head 109 (Figures 21 and 23) by the action of the retaining arm 252 which is pivoted to the frame boss 253 and held up against the spider projection 251 by the spring 254, and remains behind the projection 251 until the release member 255 carried by the head 109 contacts with the cam surface 256 of the adjustable cam 257 which is mounted upon retaining arm, to lower the retaining arm 252 and thereby release the clamp spider 244 to permit its return with the balance of the clamping assembly to its original position.

Projecting from the end of the main drive shaft 61 is an adjustable stop 258 against which the push-up plunger 206 abuts upon the return stroke of the reciprocating head 109 in order that the pawl 215 may re-enter the notch 214.

In the next operating cycle of the machine the turret is rotated until the spindle assembly 7 reaches the 8th station where the pear is sliced into halves or sections depending upon the number of slicing knives placed in the machine. The slitting assembly 260 illustrated in enlarged detail in Figures 2 and 18 includes two parallel knives 261 forming a double knife with a space between the blades just sufficient to permit the impelling blade 23 and the corer knife 25 to pass between them while a knife 262 is positioned diametrically opposite to the double knives 261. The double knife 261 is supported upon the outer end of the knife arm 263 while the single knife 262 is supported upon the outer end of the knife arm 264 the rear end each being fixed to a knife bracket 265 which has a threaded hub projecting through the reciprocating head 109 and is clamped in position by the nut 266. The nut 266 is also threaded (Figure 22) to receive the spring tube 267 which has a cap 268 to retain one end of the spring 269. A rod 270 is slidably mounted in the knife bracket 265 and to one end is provided with a pair of adjusting nuts 271 against which the other end of spring 269 is adapted to act, while the opposite end of the rod is fixed to the aligning plunger 272 which is adapted to slide along the ways formed by the knife arms 263 and 264. The aligning plunger 272 is counterbored as at 273 (Figure 16) to receive and hold in alignment the stemming tube 17. Two concave rollers 274 are each mounted upon an arm 275 and each arm is pivotally mounted to the knife bracket 265 as at 276, and a spring 277 extends between the arms to yieldingly urge them together. The concaved rollers 274 are normally held apart or in open position by a lever 278 mounted upon the pivotal portion of each of the arms and to the upper end of each lever is pivotally connected one end of an actuating rod 279 while the opposite end of each rod 279 is fixed to the auxiliary head 111 as at 280.

The slitting assembly 260 is operated by the movements of the reciprocating head 109 and the auxiliary head 111 and as the head 111 moves forward first the concaved rollers are permitted to move to closed position by the actuating rod 279 levers 278 and the action of spring 277. When the rollers have closed, the head 109 starts moving forward to carry the entire slitting assembly and during this forward motion the counterbore 273 of the aligning plunger 272 engages and centers the stemming section 21 of the stemming tube 17. As the forward motion of the aligning plunger 272 is stopped upon engaging the stemming tube the spring 269 is provided to permit further forward movement of the slitting assembly during which the aligning head slides along the knife arms 163 and 164, compressing the spring 269. Further movement of the slitting assembly causes the concaved rollers 274 to engage and clamp the pear while knives 263 and 264 are passed through the pear. If the pear was not clamped during the slitting operation it would be liable to split or crack open when only partially sliced. Upon the return stroke the auxiliary head 111 moves first and opens the concaved rollers 274 by pulling upon the actuating rod 279 while the slitting assembly is held stationary by the head 109 and finally the head 109 moves the slitting assembly back to its initial position.

The finished halves of the pear then fall from the machine.

The operations described are progressive and each step is accomplished by the operation of the control handle 131, it being necessary when desiring to finish the last pear fed to the machine to operate the control handle 131 seven successive times to clear the machine. In the ordinary run, the pear is fed to each spindle as it reaches the feeding position.

When preparing fruit such as pears for drying it may be desirable to leave the skin on the pear and therefore the stem trimming knife, the peeling assemblies and trimming knife would be rendered ineffective so that the preparation of the fruit would include only the stemming, coring, or cutting of the seed pod from the meat of the pear and the slicing of the pear into sections.

The preferred embodiment of the machine as illustrated in the drawings is primarily adapted to prepare pears for canning but the machine may be used for paring other fruits, and without effecting spirit and scope of the invention as set forth in the appended claims variations in construction or arrangement of the parts may be made to enable the machine to prepare vegetables.

What we claim is:

1. A fruit impaling device for a paring machine, including the combination of a turret head, a plurality of spindles slidably mounted in said turret and each spindle having a fruit stemming and supporting means, and means serially engaged by said spindles and operable for sliding the engaged spindle to impale and simultaneously stem the fruit.

2. A fruit impaling device for a paring machine, including the combination of a turret head, a plurality of spindles slidably mounted in said turret and each spindle having a fruit stemming and supporting means, a spindle sliding means serially engaged by said spindles and operable to slide the engaged spindle to impale and simultaneously stem the fruit, and a means slidably mounted in the machine and oppositely disposed to the said engaged spindle and also operable by said spindle sliding means to assist in impaling the fruit upon the engaged spindle.

3. A fruit impaling device for a paring machine, including the combination of a turret head, a plurality of spindles slidably mounted in said turret head and each spindle having a fruit stemming and supporting means, a manually operable means serially engaged by said spindles and operable to slide the engaged spindle to impale and simultaneously stem the fruit, and a means slidably mounted in the machine and opposed to the said engaged spindle and operated by said manually operable means to assist in impaling the fruit upon the engaged spindle.

4. A fruit impaling and controlling device for a fruit paring machine, including the combination of a single cycle driving clutch arranged when actuated into engagement to drive the machine through one complete operating cycle and then to automatically disengage, a turret head rotatively mounted in the machine and rotated a predetermined amount each time said driving clutch is actuated, a plurality of spindles slidably mounted in said turret head and each spindle having a fruit stemming and supporting means, and a control handle positioned to engage one of said spindles each time said turret head comes at rest and operable to slide the said engaged spindle to impale and simultaneously stem the fruit and only thereafter operable to actuate into engagement said driving clutch.

5. A fruit impaling and controlling device for a fruit paring machine, including the combination of a single cycle driving clutch arranged when actuated into engagement to drive the machine through one complete operating cycle and then to automatically disengage, a turret head rotatively mounted in the machine and rotated a predetermined amount each time said driving clutch is actuated, a plurality of spindles slidably mounted in said turret head and each spindle having a fruit stemming and supporting means, a control handle positioned to engage one of said spindles each time said turret head comes to rest and operable to slide the said engaged spindle to impale and simultaneously stem the fruit and only thereafter operable to actuate into engagement said driving clutch, and a means slidably mounted in the machine and oppositely disposed to said engaged spindle and operable by said control handle simultaneously with said engaged spindle for impaling the fruit thereupon.

6. A fruit impaling and controlling device for a fruit paring machine, including the combination of a driving clutch, means for actuating said driving clutch into engagement to drive the machine through one complete operating cycle and then to be automatically disengaged, a locking means for said clutch actuating means, a turret head rotatively mounted in the machine and rotated a predetermined amount each time said driving clutch is actuated, a plurality of spindles slidably mounted in said turret head and each spindle having a fruit stemming and supporting means and each spindle also having means for releasing said locking means, a control handle positioned to engage one of said spindles each time said turret head comes to rest and operable to slide the said engaged spindle to impale and simultaneously with the completion of the impaling operation to cause the releasing means of said spindle to release said locking means and operable only after the fruit has been impaled and said locking means released to operate said clutch actuating means.

7. A fruit impaling and controlling device for a fruit paring machine including the combination of a driving clutch, a means operable to actuate said clutch into engagement to drive the machine through one complete operating cycle and then to be automatically disengaged, a locking means for said clutch actuating means, a turret head rotatively mounted in the machine and rotated a predetermined amount each time said driving clutch is actuated, a plurality of spindles slidably mounted in said turret head and each spindle having a fruit stemming and supporting means and each spindle also having means for releasing said locking means, a control handle positioned to engage one of said spindles each time said turret head comes to rest and operable to slide the said engaged spindle to impale and simultaneously with the completion of the impaling operation to cause the release means of the engaged spindle to release said locking means and after the completion of the said impaling operating and the releasing of said locking means to be operable to actuate said clutch actuating means, and a means slidably mounted in the machine and oppositely disposed to the said engaged spindle and operable by said control handle for impaling the fruit.

8. A plurality of spindle assemblies of a fruit paring machine of the turret type, each spindle assembly including the combination of a spindle shaft rotatably and slidably mounted in the turret head of the machine, a spindle rotating means for rotating the spindle shaft a predetermined amount between different positions of the turret head, a spindle locking means for locking the spindle against rotation when the spindle shaft is out of engagement with said spindle rotating means, a fruit impaling and stemming means secured to one end of said spindle shaft, a stem ejecting means associated with the spindle shaft and said fruit impaling and stemming means, a cam means mounted upon the machine for actuating said stem ejecting means, a coring and trimming means operatively associated with said spindle shaft, a means for locking said coring and trimming means against rotation, a means for releasing said coring and trimming locking means and for thereafter rotating said coring and trimming means, a guard means slidably mounted upon said spindle shaft and having a sliding connection therewith to permit a limited amount of motion between said guard means and said spindle shaft, a manually operable means engageable with the spindle shaft at one position of the turret head and operable to slide the spindle shaft together with said impaling and stemming means in one direction to impale the fruit thereon, a cam means engageable with the spindle shaft at another position of the turret head to slide the spindle shaft and said impaling and stemming means in the other direction, a pusher means for pushing the fruit and said guard means along said impaling and stemming means, a release means for said pusher means positioned to be engaged by said guard means to release said pusher means when the fruit has penetrated to a predetermined extent said coring and trimming means.

9. A peeling device for a fruit paring machine, including the combination of a fruit supporting means, a reciprocatory head slidably mounted in the machine, a pair of arms pivotally mounted at one end to said head, a peeling assembly pivotally mounted upon the other end of each of said arms and each peeling knife assembly having a peeling knife adjustably secured thereto and a guard roller journaled thereon and a spring means for yieldingly urging said peeling knives toward said fruit supporting means, an auxiliary head slidably mounted in the machine and having a connecting means between said auxiliary head and each of said arms arranged when said auxiliary head is moved in one direction relative to said reciprocating head to yieldingly cause the peeling knives to approach each other and when the auxiliary head is moved in the other direction relative to said reciprocating head to cause the peeling knives to move apart, and means operative to first cause relative movement in one direction between said heads to yieldingly close said peeling knives upon the fruit mounted upon said fruit holding means and thereafter for causing said heads to move in unison to draw said peeling knives over said fruit and thereafter to cause a relative movement in the opposite direction between said heads to open said peeling knives and thereafter to move both of said heads in unison back to their initial starting positions.

10. A peeling knife assembly for a fruit paring machine including the combination of a supporting frame pivotally mounted in the machine, an arcuate peeling blade extending across and adjustably secured thereto and having a cutting edge positioned below and to one side of said supporting frame pivotal mounting, an eccentric bushing rotatively mounted in said frame, a locking means for said eccentric bushing, a guard roller journaled upon said eccentric bushing and having its center of rotation upon other side of said supporting frame pivotal mounting whereby a castor action between said peeling blade and said guard roller is obtained and to thereby cause the peeling blade to follow the contour of the fruit being peeled, a spring means for yieldingly urging the peeling knife into cutting engagement with the fruit.

11. A peeling knife assembly for a fruit paring machine including the combination of a peeling knife, means for producing a relative substantially longitudinal movement between the knife and the fruit, a supporting frame freely pivoted in the machine upon which frame the peeling blade is mounted and the peeling blade having a cutting edge positioned below and to one side of said supporting frame pivotal mounting, a guard roller journaled to said frame and having its center of rotation located upon the other side of said supporting frame pivotal mounting, and a spring means for yieldingly urging the supporting frame to rotate in a direction which will cause said peeling knife to penetrate the fruit being peeled.

12. A peeling knife assembly for a fruit paring machine including the combination of a peeling blade, means for producing a relative substantially longitudinal movement between the knife and the fruit, a supporting frame freely pivoted in the machine, the peeling blade being secured to said frame and having a cutting edge positioned below and to one side of said supporting pivotal mounting, a fruit engaging means secured to said frame and having a fruit engaging surface located upon the other side of the supporting frame pivotal mounting.

13. A peeling knife assembly for a fruit paring machine including the combination of a peeling knife, means for producing a relative substantially longitudinal movement between the knife and the fruit, a supporting frame freely pivoted in the machine upon which the peeling blade is secured to said frame and having a cutting edge positioned below and to one side of said supporting frame pivotal mounting, a fruit engaging means secured to said frame and having a fruit engaging surface located upon the other side of the supporting frame pivotal mounting, and a spring means adapted to yieldingly urge said peeling knife toward the fruit to be peeled.

14. In a fruit paring machine, the combination of a single revolution clutch for driving the machine when actuated through one complete operating cycle and then to be automatically disengaged, a clutch actuating means, a turret head rotatively mounted in the machine and having a plurality of paring stations and rotated to advance one station each time said clutch is actuated, a fruit supporting means rotatively and slidably mounted on said turret head at each station thereof, a control means located at one of said turret stations and engagable with the fruit supporting means presented to the one station to slide said fruit supporting means to impale the fruit to be pared thereon and said control means thereafter operable to actuate said clutch actuating means, a plurality of peeling assemblies mounted in the machine and of less number than said turret paring stations and each peeling assembly opposed to one of said turret paring stations, operating means for each of said peeling assemblies actuated during the operating cycle of the machine after the turret head has been rotated, and means operable during the rotation of said turret head to rotate the fruit supporting means a predetermined amount between the different peeling stations.

15. In a fruit paring machine the combination of a driving means for the machine adapted when actuated to drive the machine through one complete operating cycle and then to automatically stop the machine, a means for actuating said driving means, a turret head rotatively mounted in the machine and having a plurality of paring stations, a means for rotating said turret head during one portion of the operating cycle of the machine to advance said turret head one station, a fruit supporting means rotatively and slidably mounted on said turret head at each station thereof, a control means mounted in the machine and located at one of said turret stations and engageable with the fruit supporting means at said one station to slide said supporting means to impale the fruit to be pared thereon and said control means thereafter operable to actuate said means for actuating said driving means, a plurality of peeling assemblies mounted in the machine and of less number than said turret paring stations and each peeling assembly opposed to one of said turret paring stations, an operating means for each of said peeling assemblies actuated during a second portion of the operating cycle of the machine, and means operable during the rotation of said turret head to rotate the fruit supporting means a predetermined amount between the different peeling stations.

16. A fruit clamping device for a fruit paring machine including the combination of a supporting frame, a reciprocating head slidably mounted therein, a shell secured to said reciprocating head and having a longitudinal slot, an end plate having a plurality of slots and each slot having cam surfaces, a spider slidably mounted in said shell and having an arm projecting through said longitudinal slot, a plurality of clamping arms each pivotally mounted at one end to said spider and each extending through one of the said end plate slots and engaging the cam surface thereof and each clamping arm having a spring pressed clamping block pivotally mounted upon its other end, a spring pressed plunger slidably mounted in said shell for each of said clamping arms, a means for giving said reciprocating head and shell a predetermined longitudinal movement in one direction, a stop means mounted upon said supporting frame and positioned to permit an initial movement of said spider with said shell and thereafter to arrest further movement thereof, a means for returning said reciprocating head and shell to their initial positions, a lock means for holding said spider against returning with said shell during the initial return movement thereof, a release means actuated to release said locking means after said head and shell have completed a predetermined portion of their return movement.

17. A fruit clamping device for a paring machine including the combination of a reciprocating shell having a plurality of cam surfaces, a spider slidably mounted in said shell, a plurality of clamping arms pivoted to said spider and each engageable with one of said shell cam surfaces, means for reciprocating said shell and spider, means for causing a relative movement between said shell and said spider, and an independent means for exerting a yielding pressure against each of said clamping arms to thereby independently urge each of said arms toward its respective cam surface and to firmly resist movement of the clamping arm in the opposite direction.

18. A fruit clamping device for a paring machine including the combination of a shell having a plurality of cam surfaces, a spider slidably mounted therein, a plurality of clamping arms pivoted to said spider and each engageable with one of said shell cam surfaces, means for causing a relative movement between said shell and spider, and an independent means for exerting a yielding pressure against each of said clamping arms to thereby independently urge each of said arms toward a common center and to firmly resist movement of each of said clamping arms in the opposite direction.

19. A fruit positioning, coring and trimming device for a paring machine, including a fruit supporting means, a fruit coring and trimming means associated therewith, a reciprocating means, a plunger slidably mounted therein and arranged to slide over the fruit supporting means, a means for locking said plunger to said reciprocating means, a means for releasing said locking means when the fruit has penetrated the coring and trimming means a predetermined amount, and means for actuating the said coring and trimming means for coring and trimming the fruit.

20. A fruit positioning, coring and trimming device for a paring machine, including a fruit supporting means, fruit coring and trimming knives associated therewith, a reciprocating means, a plunger slidably mounted in said reciprocating means and arranged to slide over said fruit supporting means, a means for locking said plunger to said reciprocating means whereby when the reciprocating means moves forward the plunger will likewise move forward to engage and push the fruit along the fruit supporting means, a means for releasing said locking means actuated by the fruit when the fruit has penetrated the coring and trimming knives a predetermined amount, and means for actuating said coring and trimming means for coring and trimming the fruit.

21. A fruit positioning, coring and trimming device for a paring machine, including a fruit supporting means, fruit coring and trimming knives associated therewith, a guard slidably mounted upon said fruit supporting means and arranged to be engaged and pushed along with the fruit, a reciprocating means, a plunger slidably mounted in said reciprocating means, a means for locking said plunger to said reciprocating means whereby when the reciprocating means moves forward the plunger will likewise move forward to engage and push the fruit and guard along said fruit supporting means, a means for releasing said locking means actuated by said guard when the fruit has penetrated the coring and trimming knives a predetermined amount, and means for rotating said coring and trimming means for coring and trimming the fruit.

22. In a fruit paring machine, the combination of a fruit supporting means, fruit coring and trimming knives associated therewith, a guard slidably mounted upon said fruit supporting means and arranged to be engaged and pushed along with the fruit, a reciprocating means, a plunger slidably mounted in said reciprocating means, a means for locking said plunger to said reciprocating means whereby when the reciprocating means moves forward the plunger will likewise move forward to engage and push the fruit and guard along said fruit holding means, a means for releasing said locking means actuated by said guard when the fruit has penetrated the coring and trimming knives a predetermined amount, and means for adjusting said releasing means to vary the penetration of the fruit into the coring and trimming knives.

23. A fruit positioning, coring and trimming device for a paring machine, including a fruit supporting means, fruit coring and trimming knives associated therewith, a reciprocating means, a plunger slidably mounted in said reciprocating means, a means for locking said plunger to said reciprocating means whereby when the reciprocating means moves forward the plunger will likewise move forward to engage and push the fruit along the fruit supporting means, a means for releasing said locking means actuated by the fruit when the fruit has penetrated the coring and trimming knives a predetermined amount, means for rotating said coring and trimming means for coring and trimming the fruit and means for returning said plunger to its initial locked position with said reciprocating means.

24. In a fruit paring machine, the combination of a supporting frame, a turret head rotatively mounted in said frame and having a plurality of paring stations, a fruit supporting means mounted in the turret head for each station thereof, a coring and trimming means associated therewith, a guard means slidably mounted upon said fruit supporting means, a reciprocating head slidably mounted in the supporting frame, a fruit clamping means mounted upon said reciprocating head and positioned opposite to one of said turret stations, a plunger slidably mounted in said reciprocating head and passing centrally through said fruit clamping means, means for locking said plunger to said reciprocating head, a means for releasing said locking means, means for moving said reciprocating head in one direction to cause said plunger to engage and slide the fruit together with said guard along said fruit supporting means until the fruit has penetrated the coring and peeling knives a predetermined amount at which point the guard actuates the means for releasing said locking means to stop further movement of the fruit with relation to the coring and trimming knives and to cause upon further movement said fruit clamping means to be actuated into clamping engagement with the fruit, means for rotating said coring and trimming knives to core and trim the fruit, and means for returning the reciprocating head to its initial position and to thereby cause the fruit clamping means to release the fruit and to return the plunger to its initial locked position with the reciprocating head.

25. In a fruit paring machine, the combination of a clutch driving means for the machine, a clutch actuating means for actuating said clutch into driving engagement with said machine, means for actuating said clutch out of driving engagement with said machine after the machine has been driven through one complete operating cycle, a turret head rotatively mounted in the machine and having a plurality of paring stations, a means operatively connected with said clutch means for rotating said turret head during one portion of the operating cycle of the machine to advance said turret head one station, a fruit supporting means slidably mounted upon said turret head at each station thereof, a fruit coring and trimming means rotatively associated with each fruit supporting means, a control means mounted in the machine and located at one of said turret stations and engageable with the fruit supporting means to impale the fruit to be pared thereon and operable to actuate said clutch actuating means to place the machine in operation, a reciprocating head slidably mounted in the machine, a fruit clamping means mounted upon said reciprocating head and positioned opposite to another of said turret stations, a plunger slidably mounted in said reciprocating head, means for locking said plunger to said reciprocating head, a means for releasing said locking means, an operating means for moving in one direction said reciprocating head during a second portion of the operating cycle to cause said plunger to engage the impaled fruit and slide the fruit into a predetermined paring relation with said coring and trimming means at which point said lock releasing means is actuated to release said plunger from the reciprocating head and upon further movement to cause said fruit clamping means to be actuated into clamping engagement with the fruit, means for actuating said coring and trimming means while the fruit is engaged by said clamping means, and means for returning the reciprocating head to its initial position and to thereby cause the release of the fruit by the said clamping means and to return the plunger to its initial locked position with said reciprocating head.

26. In a fruit paring machine having a plurality of fruit paring stations at one station of which there is included the combination of a fruit supporting means, a coring and trimming means associated therewith, a fruit positioning means for pushing the fruit along the fruit-supporting means, means for stopping the action of the fruit positioning means when the fruit has penetrated the coring and trimming means a predetermined amount, means for clamping the fruit in such predetermined paring position, and means operable thereafter to actuate said coring and trimming means, for coring and trimming the fruit.

27. A fruit slicing device for a fruit paring machine including the combination of a fruit supporting means, a reciprocating frame operatively mounted in the machine and opposed to said fruit supporting means, a pair of oppositely disposed halving knives mounted upon said frame, a pair of oppositely disposed fruit holding rollers mounted upon said frame and yieldingly urged toward said halving knives, and means for reciprocating said frame to cause said knives to halve the fruit impaled upon said holding means and to cause said fruit holding rollers to engage and hold the fruit from splitting during the halving operation.

28. A fruit slicing device for a fruit paring machine including the combination of a fruit supporting means, a reciprocating frame operatively mounted in the machine and opposed to said fruit supporting means, a plurality of slicing knives mounted upon said frame, a fruit holding means for each of said slicing knives having spring means for yieldingly urging each of said holding means into holding engagement with the fruit, and means for reciprocating said frame to cause said knives to slice the fruit impaled upon the supporting means into sections and to cause each of said fruit holding means to engage and hold the fruit from splitting during the slicing operation.

29. A fruit slicing device for a fruit paring machine including the combination of a fruit supporting means having a fruit impelling blade, a reciprocating frame operatively mounted in the machine and opposed to said fruit supporting means, a double slicing knife mounted upon said frame and positioned to closely straddle said impelling blade during the slicing operation, a single slicing knife mounted upon said frame and opposite to said double knife, and means for reciprocating said frame to cause said knives to halve the fruit impaled upon said fruit supporting means.

30. A fruit slicing device for a fruit paring machine including the combination of a fruit supporting means having a fruit impelling blade, a reciprocating frame operatively mounted in the machine and opposed to said fruit supporting means, a double slicing knife mounted upon said frame and positioned to closely straddle said impelling blade during the slicing operation, a single slicing knife mounted upon said frame and opposite to said double knife, means for reciprocating said frame to cause said knives to halve the fruit impaled upon said fruit supporting means, and means for holding the fruit against splitting during the halving operation.

31. In a fruit paring machine, the combination of a driving means for the machine, means manually operable for engaging said driving means to start the machine upon an operating cycle, automatic means for disengaging said driving means after the machine has completed a single operating cycle, a turret head rotatively mounted in the machine having a plurality of paring stations and rotated during one portion of the operating cycle of the machine to advance one station, a fruit supporting and stemming means slidably mounted on said turret head at each station thereof, a fruit impaling means located at one of said turret stations and engageable with the fruit supporting means presented to the one station by the rotation of the turret head to slide said fruit supporting and stemming means to impale the fruit thereon and simultaneously stem the fruit, a reciprocatory head slidably mounted in the machine, a slicing assembly frame mounted upon said reciprocatory head and opposed to the said fruit supporting means at another station of said turret head, a plurality of slicing knives mounted upon said frame, a fruit holding means for each of said slicing knives pivotally mounted upon said frame and having spring means for yieldingly urging said holding means toward a common center, an auxiliary head slidably mounted in the machine and operatively connected with said holding means to hold said means in an open position, and means driven by said driving means and operable during another portion of the operating cycle of the machine to first move said auxiliary head relative to said reciprocating head to permit said fruit holding means to swing toward a common center and second to move both of said heads in unison to drive the fruit slicing knives through the fruit and upon completion of the slicing operation to move both of said heads back to their initial starting positions.

32. In a fruit paring machine, the combination of a driving means for the machine, a means manually operable for engaging said driving means to start the machine upon an operating cycle, automatic means operable after the machine has completed a single operating cycle to disengage said driving means, a turret head rotatively mounted in the machine and having a plurality of paring stations and rotated by said driving means during one portion of the operating cycle thereof to advance the turret head one station, a fruit supporting and stemming means rotatably and slidably mounted on said turret head at each station thereof, a control means located at one of said turret stations and engageable with the fruit supporting and stemming means presented to the one station by the rotation of the turret head to slide said fruit supporting and stemming means to impale the fruit thereon and simultaneously therewith stem the fruit, a means for rotating the fruit supporting and stemming means and the fruit impaled thereon during the rotation of the turret head from one station to the next, a stemming knife positioned in the machine to engage and sever the stem end of the rotating fruit as the turret head carries said rotating fruit past said stemming knife when rotating from one position to the next, a plurality of peeling assemblies mounted in the machine and each peeling assembly opposed to other of said turret stations, operating means for each of said peeling assemblies operable by said driving means during another portion of the operating cycle of the machine, a means for rotating said fruit supporting means a predetermined amount during the rotation of the turret head between the different peeling stations, a coring and trimming means associated with each of said fruit supporting means, means for predetermining the position of the fruit with relation to said coring and trimming means located at another of said turret head stations, means for clamping the fruit in said predetermined position, means operable thereafter by said driving means for actuating said coring and trimming means, a plurality of fruit slicing knives located at another of said turret head stations, a fruit holding means for each of said slicing knives, and means operable by said driving means to drive said slicing knives through the fruit to slice said fruit into sections.

33. A fruit slicing device for a paring machine, including a fruit supporting spindle, a cutter means mounted upon said spindle and operative for cutting the seed pod free from the meat of the fruit, a reciprocating frame operatively mounted in the machine and opposed to said spindle, a pair of opposed slicing knives mounted upon said frame and arranged whereby the inner ends of said knives are spaced apart to permit said spindle to enter therebetween, and one of said knives having a relieved portion for leaving a substantial section of the fruit seed pod unsliced, whereby the sliced halves of the fruit will fall from the fruit supporting spindle upon completion of the halving operation while the seed pod thereof will remain thereon.

34. A fruit slicing device for a paring machine, including a fruit supporting spindle, a cutter means mounted upon said spindle and operative for cutting the seed pod free from the meat of the fruit, a reciprocating frame operatively mounted in the machine and opposed to said spindle, a pair of opposed slicing knives mounted upon said frame and arranged to receive said spindle therebetween, one of said knives having a relieved portion for leaving a substantial section of the seed pod unsliced, whereby the sliced halves of the fruit will fall from the fruit supporting spindle upon completion of the halving operation while the seed pod thereof will remain upon said spindle until later removed, and fruit-holding means for holding the fruit against splitting during the halving operation.

35. A fruit slicing device for a paring machine, including a fruit supporting spindle, a cutter means mounted upon said spindle and operative for cutting the seed pod free from the meat of the fruit, a reciprocating frame operatively mounted in the machine and opposed to said spindle, a plurality of slicing knives mounted upon said frame and arranged to receive said spindle therebetween, one of said knives having a full blade to slice substantially through the meat and seed pod of the fruit, and the other of said knives each having a relieved portion for leaving a substantial section of the seed pod unsliced, whereby the fruit impaled upon said supporting spindle will be sliced into sections and will leave said spindle upon completion of the slicing operation while the seed pod thereof, being only partially sliced, will remain thereon.

36. A fruit slicing device for a paring machine, including a fruit supporting spindle, a cutter means mounted upon said spindle and operative for cutting the seed pod free from the meat of the fruit, a reciprocating frame operatively mounted in the machine and opposed to said spindle, a plurality of slicing knives mounted upon said frame and arranged to receive said spindle therebetween, one of said knives having a full blade for slicing substantially through the meat and seed pod of the fruit, the other of said knives each having a relieved portion for leaving a substantial section of the seed pod unsliced, and a fruit holding means for holding each slice of the fruit from splitting during the slicing operation.

37. A fruit slicing device for a paring machine, including a fruit supporting spindle having a fruit impelling blade, a cutter means mounted upon said spindle and operative for cutting the seed pod free from the meat of the fruit, a knife frame, a plurality of slicing knives mounted upon said frame and arranged to receive said spindle therebetween, two of said knives forming a double blade arranged to closely straddle said impelling blade and having full blades for slicing substantially through the meat and seed pod of the fruit, the other of said knives each having a relieved portion for leaving a substantial section of the seed pod unsliced, and means for causing a relative movement between said supporting spindle and said knives, whereby the fruit impaled upon said spindle will be sliced into sections and will leave said spindle while the seed pod, being only partially sliced, will remain thereon.

38. A fruit slicing device for a paring machine, including a fruit supporting spindle having a fruit impelling blade, a cutter means mounted upon said spindle and operative for cutting the seed pod free from the meat of the fruit, a knife frame, a plurality of slicing knives mounted upon said frame and arranged to receive said spindle therebetween, two of said knives forming a double blade arranged to closely straddle said impelling blade and having full blades for slicing substantially through the meat and seed pod of the fruit, the remaining number of said knives each having a relieved portion for leaving a substantial section of the seed pod unsliced, means for causing a relative movement between said supporting spindle and said knives, whereby the fruit impaled upon said spindle will be sliced into sections and will leave said spindle while the seed pod being only partially sliced will remain thereon, and a fruit holding means for holding each slice of the fruit from splitting during the slicing operation.

39. In a pear paring machine, means for separating the meat of the sliced pear from the seed pod thereof, including a pear supporting spindle, a seed pod cutting means mounted upon said spindle, means for operating said cutting means for severing the seed pod free from the meat of the fruit, a plurality of slicing knives, one of which is provided with a full blade for slicing through the meat and seed pod of the pear, and the other of said knives each having a relieved portion for leaving a substantial section of the seed pod unsliced, whereby upon the completion of the slicing operation the sliced portion of the pear will leave said spindle while the seed pod will remain thereon.

40. In a fruit paring machine, a spindle for stemming and then supporting the fruit, an impelling blade mounted thereon, a sleeve rotatably mounted on said spindle, a seed pod coring knife mounted upon said sleeve, a pusher for sliding the fruit along said spindle until a predetermined portion thereof is impaled upon said sleeve and said impelling blade acting to cut an opening in the fruit into which said coring knife enters during the sliding movement of the fruit, and a driving means for imparting a relative rotation between said spindle and sleeve.

41. In a fruit paring machine, a spindle for stemming and then supporting the fruit, an impelling blade mounted thereon, a sleeve rotatably mounted on said spindle, a seed pod coring and a butt end trimming knife mounted upon said sleeve, a pusher for sliding the fruit along said spindle until said seed pod coring and butt end trimming knives have penetrated the fruit a predetermined distance, and said impelling blade acting to cut an opening in the fruit into which said coring knife enters, and a driving means for imparting a relative rotation between said spindle and sleeve.

42. In a fruit paring machine, the combination of a fruit supporting spindle, a seed pod coring knife means associated therewith, a plurality of slicing knives arranged to receive the fruit supporting spindle therebetween, one of which is provided with a full blade for slicing through the meat and seed pod of the fruit, and the other of said knives having a relieved portion for leaving a substantial section of the seed pod unsliced, whereby upon completion of the slicing operation the sliced portions of the fruit will leave the spindle while the seed pod, being only partially sliced, will remain thereon.

43. In a fruit paring machine, the combination of a fruit supporting spindle, a seed pod coring knife means associated therewith, a reciprocating frame operatively mounted in the machine and opposed to said spindle, a plurality of slicing knives mounted upon said frame and arranged to receive said spindle therebetween, one of said knives having a full blade for slicing substantially through the meat and seed pod of the fruit, the other of said knives each having a relieved portion for leaving a substantial section of the seed pod unsliced, and a fruit holding means for holding each slice of the fruit from splitting during the slicing operation.

44. In a fruit paring machine, the combination of a fruit supporting spindle having a fruit impelling blade, a sleeve journaled upon said spindle, a seed pod coring knife mounted upon said sleeve, means for rotating said sleeve with relation to said spindle to cut the seed pod free from the meat of the fruit, a slicing knife frame, a plurality of slicing knives mounted upon said frame and arranged to receive said spindle therebetween, two of said knives forming a double blade arranged to closely straddle said impelling blade, and having full blades for slicing substantially through the meat and seed pod of the fruit, the other of said knives each having a relieved portion for leaving a substantial section of the speed pod unsliced, and means for causing a relative movement between said supporting spindle and said knives, whereby the fruit impaled upon said spindle will be sliced into sections and will leave the machine while the seed pod, being only partially sliced, will remain thereon.

45. A coring station for a paring machine including a fruit supporting means, a fruit coring means associated therewith, a fruit positioning means for pushing the fruit along the fruit supporting means, means for stopping the action of the fruit positioning means when the fruit has penetrated the coring means a predetermined amount, and means for operating said coring means for coring the fruit.

46. A fruit slicing device for a paring machine including a fruit supporting spindle, a seed pod coring means associated with said spindle and operative for severing the seed pod from the meat of the fruit, a plurality of knives arranged to receive the fruit supporting spindle therebetween and each of said knives having a relieved portion for leaving the seed pod unsliced while slicing the meat of the fruit, and means for operating said knives.

47. A paring machine including a fruit supporting means, a reciprocating head operatively mounted in the machine in opposed relation to said fruit supporting means, a pair of opposed yokes pivotally mounted upon said head, a fruit paring means operatively mounted upon the free end of each yoke, an auxiliary head operatively mounted in the machine and operatively connected with each of said yokes, and a driving means operative for firstly actuating the auxiliary head for swinging the yokes to bring the fruit paring means into paring engagement with the fruit impaled upon said supporting means, secondly to simultaneously actuate both of said heads to draw the fruit paring means across the surface of the fruit, thirdly for actuating the auxiliary head for swinging the yokes to their open position, and finally for returning both of said heads to their initial positions.

48. A paring machine including a fruit supporting means, a reciprocating head operatively mounted in the machine in opposed relation to the fruit supporting means, a pair of opposed yokes pivotally mounted upon said head, a fruit paring means operatively mounted upon the free end of each yoke, an auxiliary head operatively mounted in the machine, a means for connecting the auxiliary head with each of said yokes and arranged to swing and yieldingly urge the fruit paring means carried by said yokes into paring engagement with the fruit impaled upon the supporting means when the auxiliary head is moved toward the reciprocating head and to swing the yokes to move the fruit paring means out of engagement with the fruit when the auxiliary head is moved away from the reciprocating head, and a driving means operative for firstly actuating the auxiliary head to swing the yokes and thereby to yieldingly urge the fruit paring means into paring engagement with the fruit impaled upon the supporting means, secondly to simultaneously actuate both of the heads for drawing the paring means across the surface of the fruit, thirdly for actuating the auxiliary head for moving the paring means out of engagement with the fruit and finally for returning both of said heads to their initial positions.

49. In a fruit paring machine, means for separating the meat portion of the fruit from the seed pod, including a holder adapted to receive the fruit to be operated upon, a coring knife mounted upon said holder, means for operating said coring knife for severing the seed pod from the meat of the fruit, a slicing means having a plurality of slicing knives arranged to permit the holder to enter between the ends thereof and relieved so as to leave a substantial portion of the seed pod unsliced, and means for causing a relative movement between said holder and said slicing means for slicing the meat of the fruit into a plurality of sections whereby the sliced sections of fruit will leave the holder while the seed pod remains thereon.

50. In a fruit paring machine, means for separating the meat portion of the fruit from the seed pod, including a holder adapted to receive the fruit to be operated upon, a coring knife mounted upon said holder, means for operating said coring knife for severing the seed pod from the meat of the fruit, a slicing means having a plurality of slicing knives arranged to permit the holder to enter between the ends thereof, and all but one of said knives being relieved so as to leave a substantial portion of the seed pod unsliced while the unrelieved knife is arranged to slice substantially through the seed pod, and means for causing a relative movement between said holder and said slicing means for slicing the meat of the fruit into a plurality of sections and operative for making a single cut substantially through the seed pod whereby the sliced sections of the fruit meat will leave the holder while the seed pod remains thereon, and whereby the seed pod may be easily removed from the holder due to the cut made therethrough by the slicing means.

51. In a fruit treating machine, the combination of a fruit support upon which the fruit is to be impaled, a relatively fixed grooving device arranged in advance of the support to chisel a channel in the fruit as the latter is presented to the support, a rotary celling knife intermediate said holder and grooving device, and means for intermittently driving the celling knife and automatically stopping it in alignment with the grooving device.

52. In a fruit treating machine, a spindle for supporting the fruit, an impelling blade mounted on the spindle, a sleeve rotatably mounted on said spindle, a seed pod coring knife mounted on the sleeve, a pusher for sliding fruit along the spindle, said impelling blade acting to cut an opening in the fruit into which said coring knife enters during the sliding movement of the fruit, and a driving means for imparting a relative rotation between said spindle and sleeve.

53. A peeling device for fruit peeling machines, a peeling knife, means for producing a relative substantially longitudinal movement between the knife and the fruit, a pivotally mounted supporting means upon which the peeling knife is carried, and a single fruit engaging guard mounted on said supporting means adjacent said knife for gauging the depth of cut, said guard being mounted to one side of the pivotal axis of said supporting means whereby engagement of the guard with the fruit will urge the peeling knife into peeling engagement with the fruit.

54. A peeling device for fruit peeling machines, including a peeling knife, means for producing a relative substantially longitudinal movement between the knife and the fruit, a pivotally mounted supporting means, upon which the peeling knife is carried, and a single guard roller journalled on said supporting means adjacent said guard for rotation about an axis eccentric to the pivotal axis of said supporting means whereby engagement of the guard roller with the fruit urges the peeling knife into peeling engagement with said fruit.

55. In a fruit preparation machine, a fruit clamping device including a plurality of clamp arms, guide means for said clamp arms, and means for relatively shifting said clamp arms and guide means to draw together or to separate said clamp arms, said guide means including means individually associated with each of said clamp arms to contact the arms individually with the fruit periphery and to independently lock the arms against separation except under said relative shifting movement.

56. In a fruit preparation machine, a fruit clamping device including a plurality of clamp arms mounted for swinging movement toward a common center, guide means for said clamp arms, and means for relatively shifting said clamp arms and said guide means to draw together or separate said clamp arms, said guide means including a plurality of yieldable plungers individually associated with said clamp arms and mounted to bear angularly against said arms to yieldably press each arm against the periphery of the fruit and to independently lock them against separation except under said relative shifting movement.

57. In a fruit preparation machine, a stemming tube upon which fruit may be impaled for severing the stem portion thereof, a coring knife rotating relative to said stemming tube for coring fruit impaled on the stemming tube, a splitting blade, and means for imparting relative reciprocation between said splitting blade and stemming tube to split a fruit impaled upon the stemming tube to release the fruit sections from the core.

58. In a fruit preparation machine, a fruit clamping device including a plurality of clamping arms, and yieldable means individually contacting with each of said arms to individually urge the arms toward the periphery of the fruit, and then immediately locking them against separation after each arm has contacted the periphery of the fruit.

59. In a fruit paring machine, a non-rotatable stemming tube adapted to embrace the stem of a fruit upon its being impaled thereon, means adapted to remove the stem of the fruit from the stemming tube, and a coring knife rotating relative to said stemming tube for coring fruit while impaled upon said stemming tube, and means for halving the fruit to release the sections from the core.

60. In a pear preparation machine, a centering device comprising means for receiving the stem of a pear while held by an operator, a reciprocating tube upon which a pear is impaled from the calex end while so held, means on said tube for preventing relative rotation therebetween, means for moving the pear at right angles to its longitudinal axis, a knife in the path of movement of said pear for cutting off the stem end of the pear to leave a flat end, means for removing the peel from the pear while impaled, and a reciprocating plunger in said tube for pushing the severed stem from the tube in a direction opposed to its impaling movement.

61. In a pear preparation machine, a reciprocating tube upon which a pear is impaled from the calex end to completely sever the stem from the pear, a fin on the tube to prevent relative rotation between the tube and the pear, a plunger housed within the tube adapted for reciprocation therein for pushing the severed stem therefrom in a direction opposed to its entry, peeling means for peeling the pear while so impaled, a clamp for clamping the pear after the peeling is completed, a coring knife rotatably mounted in axial alignment with said clamp, means for imparting relative reciprocation between said clamp and knife while the pear is so clamped for entering said coring knife into the zone of the core area, and means for rotating the knife to cut the core from the pear.

ALBERT R. THOMPSON.
WILLIAM DE BACK.